US010577182B2

(12) United States Patent
Bartoli et al.

(10) Patent No.: US 10,577,182 B2
(45) Date of Patent: Mar. 3, 2020

(54) APPARATUSES AND METHODS FOR PRODUCING CONTAINERS

(71) Applicant: Sarong S.p.A., Reggiolo (IT)

(72) Inventors: Andrea Bartoli, Reggio Emilia (IT); Alberto Bartoli, Quattro Castella (IT)

(73) Assignee: Sarong S.p.A. (IT)

( * ) Notice: Subject to any disclaimer, the term of this patent is extended or adjusted under 35 U.S.C. 154(b) by 591 days.

(21) Appl. No.: 14/615,601

(22) Filed: Feb. 6, 2015

(65) Prior Publication Data

US 2015/0217881 A1 Aug. 6, 2015

Related U.S. Application Data

(62) Division of application No. 12/920,620, filed as application No. PCT/IB2009/000386 on Mar. 2, 2009, now Pat. No. 8,973,341.

(30) Foreign Application Priority Data

Mar. 5, 2008 (IT) .............................. MO2008A0063

(51) Int. Cl.
   *B65G 17/12* (2006.01)
   *B65B 7/16* (2006.01)
   (Continued)

(52) U.S. Cl.
   CPC ............. *B65G 17/12* (2013.01); *B26D 1/205* (2013.01); *B26F 1/40* (2013.01); *B29C 51/20* (2013.01); *B29C 51/261* (2013.01); *B29C 51/264* (2013.01); *B29C 51/32* (2013.01); *B29C 65/08* (2013.01); *B29C 65/18* (2013.01); *B29C 65/745* (2013.01); *B29C 65/7891* (2013.01);
   (Continued)

(58) Field of Classification Search
   CPC .. B65B 3/022; B65B 3/02; B65B 3/04; B65B 61/202; B65B 61/205; B65B 2230/02; B65B 41/12; B65B 41/18; B65B 7/164; B65B 15/00; B65B 61/06; B65G 17/12; B31B 50/81; B31B 50/84; B31B 50/64; B29C 65/08; B29C 66/53461; B29C 66/81431; B29C 66/83221; B29C 66/8432
   See application file for complete search history.

(56) References Cited

U.S. PATENT DOCUMENTS 3,386,837 A * 6/1968 Arnot ................... A47G 21/004
                                                                            206/0.5
3,533,215 A * 10/1970 Ollier ..................... B65B 29/10
                                                                            53/282
(Continued)

FOREIGN PATENT DOCUMENTS

CN          1950259 A       4/2007
CN        200948892 Y       9/2007
(Continued)

*Primary Examiner* — Christopher R Harmon
(74) *Attorney, Agent, or Firm* — Laubscher & Laubscher, P.C.

(57) ABSTRACT

The apparatus includes an operating unit, which can be a welding unit for welding a closing film to an edge zone of a containing element or a separating unit for separating containing elements from portions of sheet material. The apparatus includes a control unit programmed to enable the operating unit to selectively process a continuous strip of containing elements or discrete groups of containing elements.

19 Claims, 15 Drawing Sheets

(51) Int. Cl.

| | | |
|---|---|---|
| *B65B 3/02* | (2006.01) | |
| *B29C 51/20* | (2006.01) | |
| *B26D 1/20* | (2006.01) | |
| *B26F 1/40* | (2006.01) | |
| *B29C 65/08* | (2006.01) | |
| *B29C 65/18* | (2006.01) | |
| *B65B 61/06* | (2006.01) | |
| *B29C 65/00* | (2006.01) | |
| *B31B 50/64* | (2017.01) | |
| *B31B 50/94* | (2017.01) | |
| *B32B 37/00* | (2006.01) | |
| *B32B 37/06* | (2006.01) | |
| *B32B 37/22* | (2006.01) | |
| *B32B 37/26* | (2006.01) | |
| *B65B 3/04* | (2006.01) | |
| *B32B 38/00* | (2006.01) | |
| *B29C 51/26* | (2006.01) | |
| *B29C 51/32* | (2006.01) | |
| *B29C 65/74* | (2006.01) | |
| *B29C 65/78* | (2006.01) | |
| *B65G 17/46* | (2006.01) | |
| *B65G 43/10* | (2006.01) | |
| *B26D 1/18* | (2006.01) | |
| *B26F 1/24* | (2006.01) | |
| *B29L 31/00* | (2006.01) | |
| *B65B 61/20* | (2006.01) | |
| *B29C 51/42* | (2006.01) | |

(52) U.S. Cl.
CPC .......... *B29C 66/112* (2013.01); *B29C 66/131* (2013.01); *B29C 66/1312* (2013.01); *B29C 66/24244* (2013.01); *B29C 66/53461* (2013.01); *B29C 66/81429* (2013.01); *B29C 66/81431* (2013.01); *B29C 66/83221* (2013.01); *B29C 66/8432* (2013.01); *B31B 50/64* (2017.08); *B31B 50/94* (2017.08); *B32B 37/0046* (2013.01); *B32B 37/0076* (2013.01); *B32B 37/06* (2013.01); *B32B 37/22* (2013.01); *B32B 37/26* (2013.01); *B32B 38/0004* (2013.01); *B65B 3/02* (2013.01); *B65B 3/022* (2013.01); *B65B 3/04* (2013.01); *B65B 7/162* (2013.01); *B65B 7/164* (2013.01); *B65B 61/06* (2013.01); *B65G 17/46* (2013.01); *B65G 43/10* (2013.01); *B26D 1/18* (2013.01); *B26F 1/24* (2013.01); *B29C 51/421* (2013.01); *B29C 66/73921* (2013.01); *B29C 66/8242* (2013.01); *B29C 66/91231* (2013.01); *B29C 66/9672* (2013.01); *B29C 66/9674* (2013.01); *B29C 2793/0027* (2013.01); *B29C 2793/0081* (2013.01); *B29L 2031/712* (2013.01); *B29L 2031/7164* (2013.01); *B32B 2037/268* (2013.01); *B32B 2307/748* (2013.01); *B32B 2435/02* (2013.01); *B65B 61/202* (2013.01); *Y10T 156/1062* (2015.01); *Y10T 156/12* (2015.01); *Y10T 156/17* (2015.01); *Y10T 156/19* (2015.01)

(56) References Cited

U.S. PATENT DOCUMENTS

| | | | |
|---|---|---|---|
| 3,722,779 A | 3/1973 | Chang | |
| 4,091,915 A | 5/1978 | Claasen | |
| 4,301,911 A * | 11/1981 | Albo | B31F 1/0054 198/412 |
| 4,930,637 A * | 6/1990 | DeRoseau | A45C 11/20 206/216 |
| 5,009,310 A | 4/1991 | Finney | |
| 5,054,610 A | 10/1991 | Ajello | |
| 5,067,304 A * | 11/1991 | Kuethe | B65B 57/14 53/133.1 |
| 5,090,572 A * | 2/1992 | DeRoseau | A45C 11/20 206/541 |
| 5,103,618 A * | 4/1992 | Garwood | B65B 7/168 53/433 |
| 5,105,603 A * | 4/1992 | Natterer | B29C 65/18 53/133.4 |
| 5,251,758 A | 10/1993 | Kolacek | |
| 5,341,625 A | 8/1994 | Kramer | |
| 5,379,572 A | 1/1995 | Giovannone | |
| 5,606,847 A * | 3/1997 | Joensson | B65B 7/164 53/268 |
| 5,788,620 A | 8/1998 | Aeschbach | |
| 5,794,416 A | 8/1998 | Rahman | |
| 5,802,804 A | 9/1998 | Esposti et al. | |
| 6,334,288 B1 * | 1/2002 | Amaranti | B65B 59/04 53/131.2 |
| 6,412,653 B1 | 7/2002 | Waterhouse | |
| 6,662,531 B1 | 12/2003 | Schwab et al. | |
| 6,701,695 B1 * | 3/2004 | Douglas | B65B 61/188 156/66 |
| 6,820,394 B2 * | 11/2004 | Plourde | B65B 61/188 53/133.4 |
| 6,920,737 B2 * | 7/2005 | Haws | B65B 9/04 53/133.4 |
| 6,945,017 B1 * | 9/2005 | Bonney | B29C 65/1635 206/484 |
| 7,411,162 B2 | 8/2008 | Kalinowski et al. | |
| 7,775,017 B2 | 8/2010 | Stowell | |
| 8,381,497 B2 * | 2/2013 | Scheibel | B65B 9/02 53/170 |
| 9,227,743 B2 * | 1/2016 | Natterer | B65B 9/04 |
| 9,649,807 B2 * | 5/2017 | Bartoli | B29C 51/167 |
| 2007/0194006 A1 | 8/2007 | Kalinowski et al. | |
| 2007/0227099 A1 | 10/2007 | Conti | |
| 2009/0025340 A1 * | 1/2009 | Natterer | B65B 9/04 53/433 |

FOREIGN PATENT DOCUMENTS

| | | | |
|---|---|---|---|
| EP | 0931726 A1 | 7/1999 | |
| EP | 1714886 A1 | 10/2006 | |
| GB | 2302532 * | 1/1987 | B65D 77/24 |
| JP | S54-010089 A | 1/1979 | |
| JP | H04-279438 A | 10/1992 | |
| JP | 2000-289702 A | 10/2000 | |
| JP | 2001354201 | 12/2001 | |
| JP | 2003-011905 A | 1/2003 | |
| JP | 2004237993 A | 8/2004 | |
| JP | 2004279438 A | 10/2004 | |
| JP | 2005342123 A | 12/2005 | |
| JP | 2006168750 A | 6/2006 | |
| JP | 2008-001408 A | 1/2008 | |
| JP | 2002153542 A | 5/2008 | |
| WO | 2004106162 A2 | 12/2004 | |
| WO | 2005097601 A1 | 10/2005 | |
| WO | 2005108208 A1 | 11/2005 | |

* cited by examiner

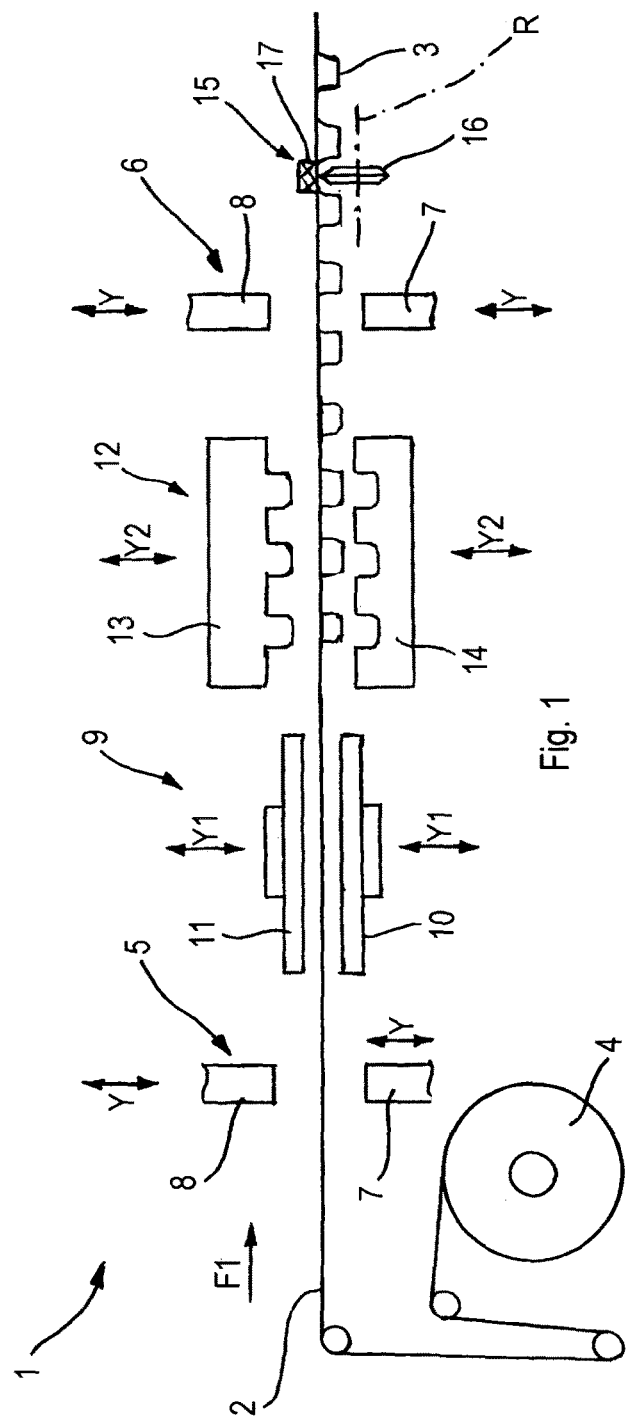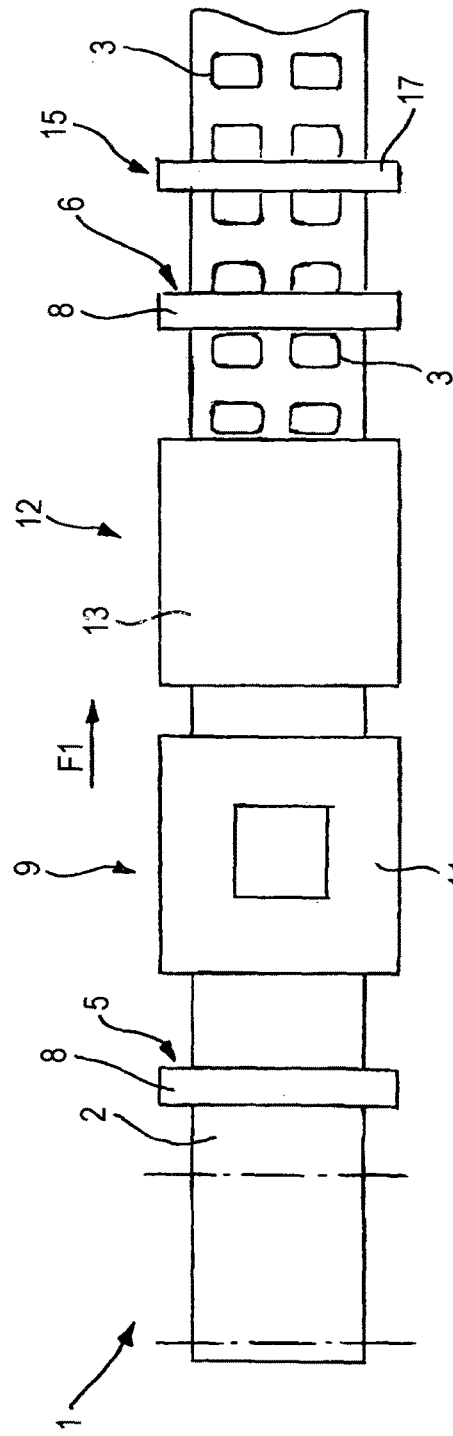

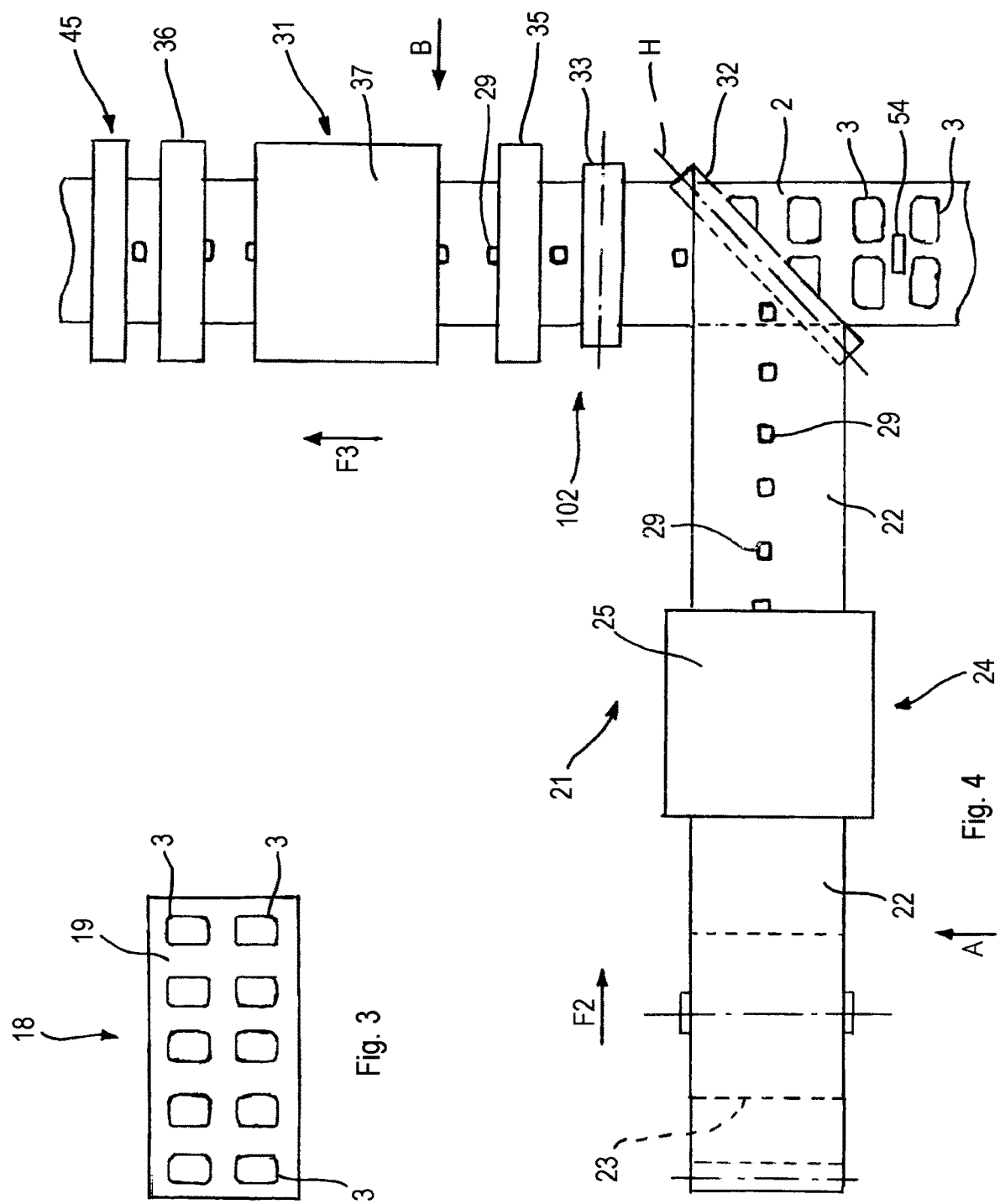

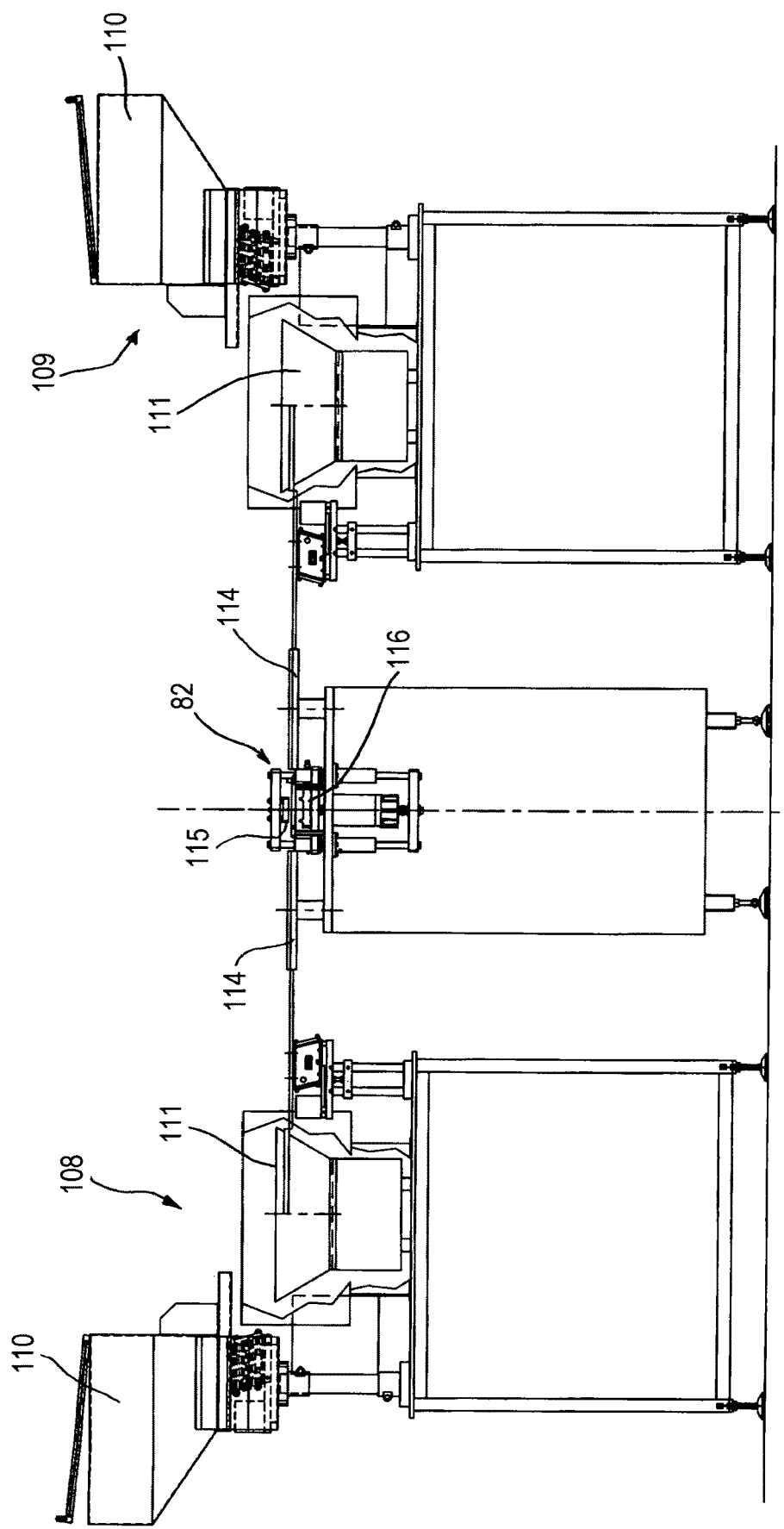

APPARATUSES AND METHODS FOR PRODUCING CONTAINERS

CROSS-REFERENCE TO RELATED APPLICATIONS

This application is a division of application Ser. No. 12/920,620 with an effective filing date of Jan. 7, 2011. Application Ser. No. 12/920,620 is a § 371 National Stage Entry of PCT International Application No. PCT/IB2009/000386 filed Mar. 2, 2009. PCT/IB2009/000386 claims priority to IT Application No. MO2008A000063 filed Mar. 5, 2008. The entire contents of these applications are incorporated herein by reference.

BACKGROUND OF THE INVENTION

The invention relates to apparatuses and methods for producing containers from a thermoformable sheet material. The containers produced with the apparatuses and the methods according to the invention are suitable for being filled with liquid or pasty products, which possibly solidify after being cooled, or with powder or loose products. Such containers, after being filled, can be used in the food, pharmaceutical, cosmetic and similar industries.

In some countries in which low-cost labour is available, it is known to package products inside containers made of thermoformable material by performing a large number of operations manually. This packaging method has the drawback that, in addition to requiring a very long time for producing finished containers, may give rise to defects in the finished containers if operators commit imprecisions during manual operations.

In order to overcome these drawbacks, a production line is known for producing containers comprising a forming unit for obtaining a plurality of cavities on a sheet material. A filling unit, arranged downstream of the forming unit, enables the cavities obtained on the sheet material to be filled. The production line further includes a welding unit, positioned downstream of the filling unit for thermowelding a closing sheet on the sheet material on which the cavities are obtained, and a cutting unit arranged downstream of the welding unit to separate single containers or groups of containers from the sheet.

The known production line, whilst it enables packaging operations to be speeded up and good-quality containers to be obtained, is not particularly versatile. Further, such a line is suitable for serial production of large quantities of containers, but it is not suitable for producing small batches of containers that are different from one another, as occurs when samples have to be arranged to check whether consumers will like a certain type of product.

SUMMARY OF THE INVENTION

An object of the invention is to improve known apparatuses and methods for producing containers.

A further object is to provide apparatuses and methods that enable the number of manual operations to be reduced that are required for obtaining containers.

Another object is to provide apparatuses for producing containers that are provided with great versatility.

Still another object is to provide apparatuses that can easily be used both for serial production of large quantities of containers and for production of small batches.

In a first aspect of the invention, there is provided an apparatus comprising a welding unit for welding a closing film to an edge zone of a containing element, wherein the apparatus comprises a control unit programmed to enable the welding unit to process selectively a continuous strip of containing elements or discrete groups of containing elements.

Owing to the first aspect of the invention, it is possible to obtain an apparatus for closing containing elements by means of a closing film that can operate both in isolation and integrated into a production line. In the first case, the apparatus processes discrete groups of containing elements that may have been subjected to manual operations, for example manual filling operations. These discrete groups can be used when small samples of containers have to be arranged or in countries in which cheap labour is available. In the second case, the apparatus processes a continuous strip of containing elements and enables high-speed containers to be obtained.

In a second aspect of the invention, there is provided an apparatus comprising a separating unit for separating containers from portions of sheet material, wherein the apparatus comprises a control unit programmed to enable the separating unit to process selectively a continuous strip of containers or discrete groups of containers.

The apparatus according to the second aspect of the invention is very versatile, inasmuch as it can be inserted into a production line to produce containers from a sheet material that is unwound in a continuous manner, but can also work in isolation, i.e. outside the production line to process discrete groups of previously formed containing elements.

In a third aspect of the invention, there is provided an apparatus comprising a coupling device for coupling a closing film with a sheet material having a plurality of containing cavities, wherein it comprises a cutting unit for removing a portion of the closing film so that, when the closing film is coupled with the sheet material, a zone of the sheet material remains uncovered by the closing film.

Owing to the cutting unit combined with the coupling device, it is possible to obtain containers in a particularly rapid and automated manner.

In one embodiment, the apparatus comprises a supplying device for supplying the closing film in a supply direction.

In a further embodiment, the apparatus comprises an adjusting device for adjusting the position of the cutting unit along the supply direction.

In a fourth aspect of the invention, there is provided a method comprising removing a portion of a closing film in a cutting unit and coupling the closing film with a sheet material having a plurality of containing cavities, wherein the method comprises the step of adjusting the position of the cutting unit so that, after coupling, a preset zone of the sheet material is positioned at a region of the closing film from which the portion has been removed.

In one embodiment, the preset zone that it is desired to maintain uncovered by the closing film comprises a tab for opening a container including a containing cavity.

In a further embodiment, the preset zone that it is desired to maintain uncovered by the closing film comprises a protrusion that projects from a face of said sheet material opposite a further face of said sheet material from which the containing cavities project.

By adjusting the position of the cutting unit, it is possible to ensure that a desired zone of the sheet material on which the containing cavities are obtained remains devoid of the closing film, which enables even special containers to be produced in a highly automated manner, i.e. containers that are different from the common containers in which the closing film can be applied in a uniform manner.

In a fifth aspect of the invention, there is provided an apparatus comprising an unwinding device for unwinding a closing film from a reel, a coupling device for coupling the closing film with a sheet material having a plurality of containing cavities, wherein it comprises a joining device arranged upstream of the coupling device for joining to the closing film a removing element that is usable by a consumer to remove contents from a containing cavity.

In a sixth aspect of the invention, there is provided a method comprising unwinding a closing film from a reel, coupling the closing film with a sheet material having a plurality of containing cavities, wherein, before coupling, the method comprises the step of joining to the closing film a removing element that is usable for removing contents from a containing cavity.

In one embodiment, the removing element comprises a spoon element.

In one embodiment, the spoon element is substantially flat.

Owing to the fifth and sixth aspect of the invention, it is possible to produce in a highly automated manner a plurality of containers provided with a removing element that the consumer can use, for example, for eating a product contained in a container.

In a seventh aspect of the invention, there is provided a method comprising the steps of advancing a portion of sheet material from which a plurality of containers is obtained, separating the containers from the sheet material, wherein after separating, each container falls into a corresponding seat of a collecting tray underneath.

In an eighth aspect of the invention, an apparatus is provided comprising a separating unit for separating containers from a portion of sheet material, a conveying device for conveying to the separating unit collecting trays suitable for receiving the containers, the conveying device comprising a reference device for positioning the collecting trays in a preset position with respect to the separating unit, so that each container can be received in a corresponding seat of the collecting tray.

The collecting tray in which the containers are received, after being filled, can be removed manually or automatically and be used to support the containers during subsequent handling steps, for example during transporting of the containers to retailers or also during selling. This enables the handling steps of the containers after production to be improved.

BRIEF DESCRIPTION OF THE FIGURES

The invention can be better understood and implemented with reference to the attached drawings that illustrate some embodiments thereof by way of non-limiting example, in which:

FIG. 1 is a schematic side view showing an apparatus for forming a plurality of containing cavities on a sheet material;

FIG. 2 is a schematic plan view of the apparatus in FIG. 1;

FIG. 3 is a schematic plan view of a group of containing cavities that are obtainable from the apparatus in FIG. 1;

FIG. 4 is a schematic plan view of an apparatus for applying a closing film to a plurality of containing cavities;

FIG. 17 is a side view of the positioning device in FIG. 16;

DETAILED DESCRIPTION

Figure 5:
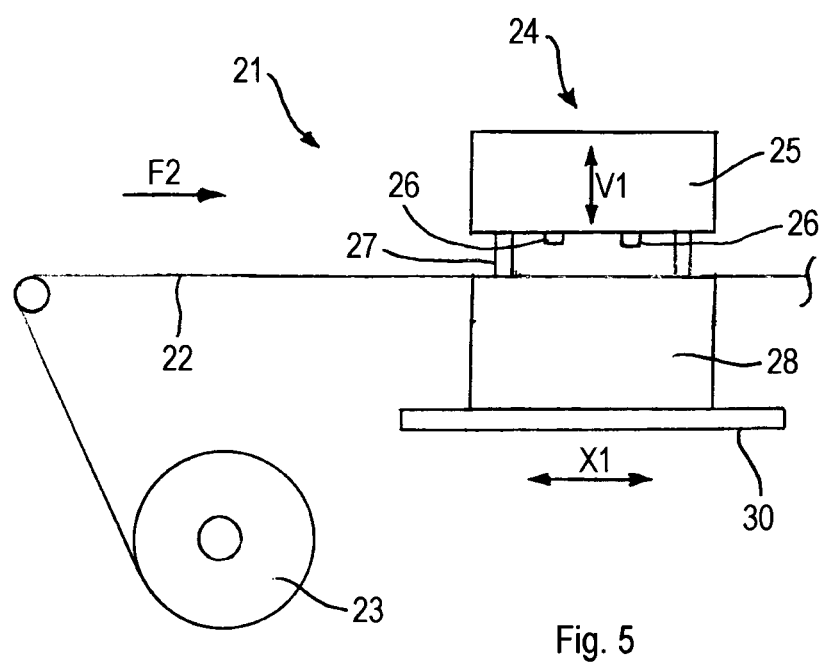
FIG. 5 is a schematic side view of a first portion of the apparatus in FIG. 4, taken in the direction A in FIG. 4.

FIGS. 1 and 2 show a forming apparatus 1 for forming on a sheet material 2 a plurality of containing elements having the shape of containing cavities 3. The sheet material 2 is a thermoformable and weldable material and can comprise, for example, a film of plastics. The sheet material 2 is unwound from a reel 4 and indexed by an advancing device along an advancing direction F1. The advancing device comprises a first gripper 5 and a second gripper 6 arranged in sequence along the advancing direction F1. The first gripper 5 and the second gripper 6 each comprise a lower gripping element 7 and an upper gripping element 8, at least one of which is movable in a clamping direction Y that is transverse to the advancing direction F1, and which are arranged on opposite parts of the sheet material 2. In particular, the lower gripping element 7 and the upper gripping element 8 are movable in relation to one another between a disengaging position shown in FIG. 1, in which the sheet material 2 is disengaged from the lower gripping element 7 and from the upper gripping element 8, and a clamping position that is not shown, in which the sheet material 2 is clamped between the lower gripping element 7 and the upper gripping element 8. In the clamping position, the first gripper 5 and the second gripper 6 can move along the advancing direction F1 to move the sheet material 2 inside the forming apparatus 1.

In the example shown, the sheet material 2 advanced by the first gripper 5 and by the second gripper 6 defines a substantially horizontal plane.

The forming apparatus 1 comprises, downstream of the first gripper 5, a preheating station 9 for heating the sheet material 2 to a temperature at which the sheet material 2 is softened and can be easily thermoformed. The preheating station 9 comprises a lower plate 10 and an upper plate 11 that are movable transversely to the advancing direction F1, as indicated by the arrows Y1, to bring close and heat the sheet material 2 whilst it is stationary in the preheating station 9.

Downstream of the preheating station 9, which with certain types of sheet material 2 can be omitted, there is provided a forming station 12 comprising a male half mould 13 and a female half mould 14 interacting together to form on the sheet material 2 the containing cavities 3, for example by thermoforming. The male half mould 13 and the female half mould 14 are also movable transversely to the advancing direction F1, as indicated by the arrows Y2, so as to move towards or away from the sheet material 2.

Downstream of the forming station 12 there is a separating device 15, comprising, for example, a blade 16, cooperating with an abutting element 17 for cutting the sheet material 2 along a line that is transverse, for example perpendicular, to the advancing direction F1. The blade 16 and the abutting element 17 are positioned on opposite parts of the sheet material 2. In the example shown, the blade 16 is arranged below the sheet material 2, whilst the abutting element 17 is positioned above the sheet material 2. The blade 16 may have the shape of a disc and is rotatable around a rotation axis R that is substantially parallel to the advancing direction F1. A movement device that is not shown moves the blade 16 transversely to the advancing direction F1, more in particular perpendicularly to this direction, so that the rotation axis R is maintained parallel to itself. In this manner groups 18 of containing cavities are separated from the sheet material 2, one of the groups 18 of containing cavities being shown in FIG. 3, including a plurality of containing cavities 3 joined together by a flat portion 19 of sheet material 2.

The forming apparatus 1 further comprises an activating device that is not shown for selectively activating or deactivating the separating device 15. If the separating device 15 is deactivated, i.e. not operating, a continuous strip of containing cavities 3 exits from the forming apparatus 1. In this case, the forming apparatus 1 can be inserted into an automated line to produce filled and closed containers from a continuous sheet material. Downstream of the forming apparatus 1 a filling unit will therefore be arranged that is followed by other operating units.

If, on the other hand, the separating device 15 is activated, the forming apparatus 1 produces the groups 18 of containing cavities, which can be temporarily stored, or processed manually before undergoing other possible automated operations. For example, the groups 18 can be filled manually with a desired product. In this case, the forming apparatus 1 is not integrated into a continuous production line, but operates in isolation.

Figure 6:
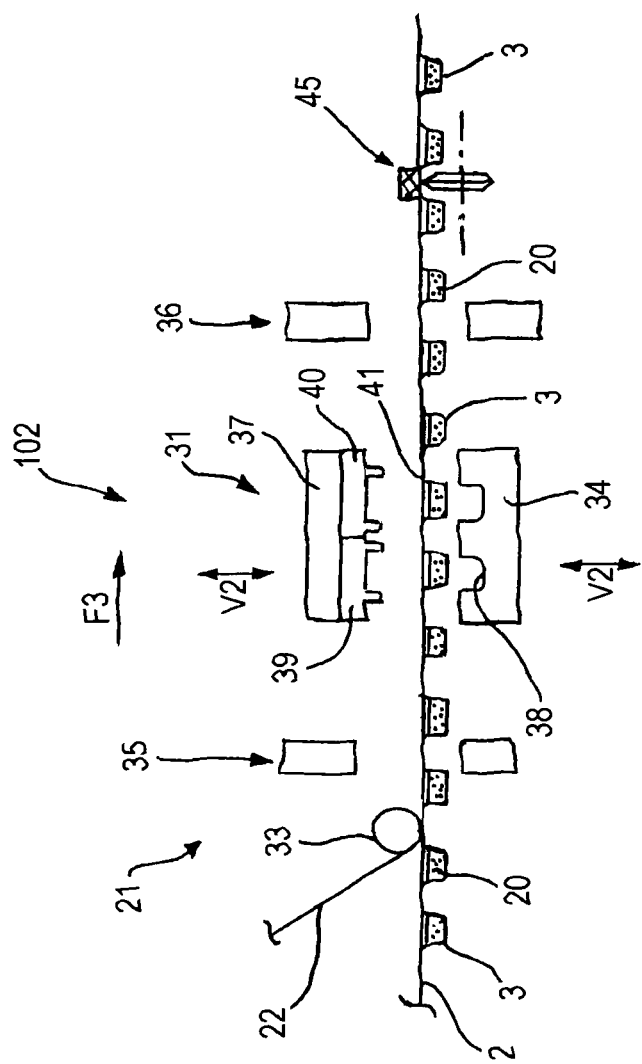
FIG. 6 is a schematic side view of a second portion of the apparatus in FIG. 4, taken from the direction B in FIG. 4.

FIGS. 4 to 6 show a welding apparatus 21 for applying a closing film 22 to a plurality of containing cavities 3. The containing cavities 3 were formed previously on a sheet material 2, for example by the forming apparatus 1 shown in FIGS. 1 and 2, and then filled with a desired product 20.

The closing film 22 can be a film of plastics that is unwound from a respective reel 23, as shown in FIGS. 4 and 5, and indexed along a supply direction F2. Whilst it advances along the supply direction F2, the closing film 22 defines a substantially horizontal plane.

The welding apparatus 21 comprises a cutting station 24, including a cutting device acting on the closing film 22 to remove preset portions therefrom. The cutting device comprises a supporting element 25 on which are mounted one or more shearing members 26 having a cutting profile corresponding to the shape of the portions that it is desired to remove from the closing film 22. In the example shown in FIG. 5, on the supporting element 25 two shearing members 26 are mounted that have respective substantially quadrilateral cutting profiles.

The cutting device further comprises an abutting base 28, positioned on the side of the closing film 22 opposite the supporting element 25 and interacting with the shearing members 26 during cutting.

As indicated by the arrow V1, the supporting element 25 is slidable along columns 27 that project from the abutting base 28 transversely to the supply direction F2, in particular perpendicularly to this direction. In this manner the supporting element 25 can move between a rest position, shown in FIG. 5, in which the shearing members 26 are distanced from the closing film 22, and a work position that is not shown, in which the shearing members 26 are in contact with the abutting base 28 to remove the portions of closing film 22, so as to define on the closing film 22 a plurality of openings 29.

The cutting station 24 comprises an adjusting device for adjusting the position of the cutting device along the supply direction F2. The adjusting device may comprise one or more guide elements 30 along which the abutting base 28, together with the columns 27 and the supporting element 25, is slidable, as indicated by the arrow X1. The guide elements 30 extend parallel to the supply direction F2.

The abutting base 28, the columns 27 and the supporting element 25 can be moved along the guide elements 30 manually or automatically, for example by a driving device that may comprise an actuator that is not shown. A locking device that is not shown enables the cutting device to be fixed in the desired position along the guide elements 30, after the adjusting operations have been performed.

The reason for which the adjusting device is provided will be disclosed in detail below.

The welding apparatus 21 further comprises an operating unit including a welding station 31 that enables the closing film 22 to be welded to the sheet material 2, so as to close the containing cavities 3. The welding station 31 is positioned along a portion 102 of the path of the sheet material 2 that, in the example shown, extends in a conveying direction F3 that is substantially perpendicular to the supply direction F2.

A direction-switching device enables the closing film 22 to be switched from the supply direction F2 to the conveying direction F3. The direction-switching device comprises a plurality of rollers, including a direction-switching roller 32, shown in FIG. 4, that is rotatable around an axis H that lies on a horizontal plane and is tilted by 45° with respect to the supply direction F2.

A coupling roller 33, shown in FIGS. 4 and 6, is arranged downstream of the direction-switching device and enables the closing film 22 to be brought into contact with the sheet material 2.

The sheet material 2, arranged in contact with the closing film 22, is indexed through the welding station 31 by a conveying device comprising a gripper 35 and a further gripper 36, which are completely similar to the first gripper 5 and to the second gripper 6 disclosed with reference to FIGS. 1 and 2.

As shown in FIG. 6, the welding station 31 comprises a coupling device including a lower plate 34 interacting with an upper plate 37. On the lower plate 34 a plurality of recesses 38 are obtained that are suitable for receiving the containing cavities 3 obtained on the sheet material 2. The upper plate 37 on the other hand supports a heated welding element 39 and a non-heated stabilising element 40, shown in FIG. 6.

The upper plate 37 and the lower plate 34 are moveable transversely to the conveying direction F3, as indicated by the arrows V2, between a distanced position shown in FIG. 6 and a contact position that is not shown. In the distanced position, the lower plate 34 and the upper plate 37 are distanced from the sheet material 2 and from the closing film 22, which can advance freely in the conveying direction F3. In the contact position, the sheet material 2 and the closing film 22 are clamped between the lower plate 34 and the upper plate 37 to join the closing film 22 to the sheet material 2 along edge zones 41 surrounding the containing cavities 3. In particular, the heated welding element 39 applies the heat and the pressure that enable the closing film 22 to be welded to the sheet material 2, whilst the non-heated stabilising element 40, arranged downstream of the heated welding element 39, applies pressure to stabilise the weld that has just been formed.

In the case disclosed above, the welding station 31 thus acts as a thermowelding station, inasmuch as it thermowelds the closing film 22 to the sheet material 2, i.e. couples the closing film 22 with the sheet material 2 owing to the combined action of heat and pressure. In one embodiment that is not shown, the welding station 31 can also operate according to a different principle. For example, the welding station 31 can comprise an ultrasound welding device that enables the closing film 22 to be joined to the sheet material 2.

Downstream of the welding station 31 a separating device 45 is arranged which is completely analogous to the separating device 15 disclosed with reference to FIGS. 1 and 2. If the separating device 45 is activated, it enables discrete groups of containing elements, each containing element comprising a containing cavity 3 filled with the product 20 and closed by a portion of closing film 22, to be separated from a continuous strip of sheet material 2, to which a continuous closing film 22 has been welded.

The adjusting device included in the cutting station 24 enables the openings 29 to be obtained on the closing film 22 in a desired position so that, when the closing film 22 is coupled with the sheet material 2, the openings 29 are positioned at preset zones of the sheet material 2 that it is desired should be devoid of the closing film 22. This can be useful if it is desired to obtain containers of the type shown in FIGS. 7 and 9.

Figure 7:
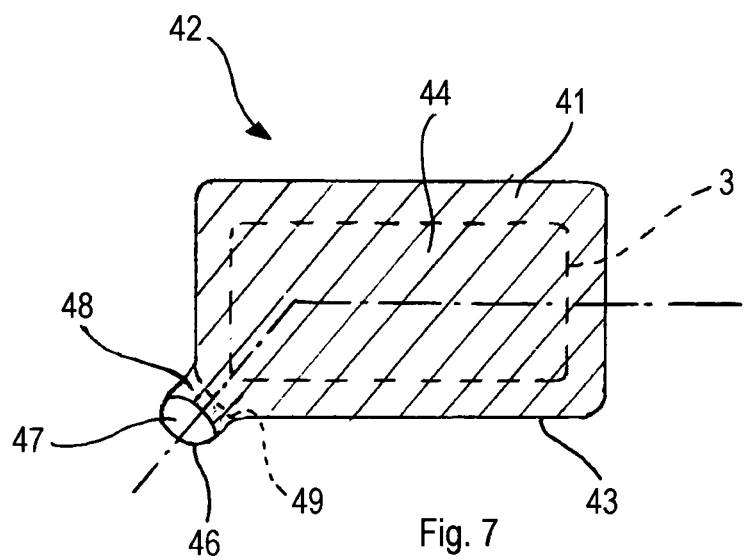
FIG. 7 is a schematic plan view of a container that is obtainable with the apparatus in FIG. 4.

FIG. 7 is a plan view that shows a container 42 comprising a containing body 43 obtained from the sheet material 2 and having a containing cavity 3. The containing body 43 is closed by a closing portion 44 obtained from the closing film 22 and joined to the containing body 43 along an edge zone 41 that surrounds the containing cavities 3. The containing body 3 is provided with an opening tab 46 that projects from the edge zone 41.

The openings 29 are positioned on the closing film 22 so that the closing film 22 covers only partially the opening tab 46, in which it is possible to define an uncovered zone 47 in which the closing film 22 is absent. The uncovered zone 47 corresponds to a zone of the closing film 22 in which an opening 29 has been obtained.

In the opening tab 46 it is moreover possible to define a coupling zone 48, in which the closing film 22 is coupled with the sheet material 2. The uncovered zone 47 is complementary to the coupling zone 48.

In a region in which the opening tab 46 is connected to the edge zone 41, on the sheet material 2 there is obtained an intended separating line 49, comprising for example a continuous or interrupted notch or cut having the object of causing the sheet material 2 to break along the intended separating line 49 when subjected to stress. The intended separating line 49 can be obtained when the sheet material 2 is processed by the forming apparatus 1, for example in the forming station 12.

Figure 8:
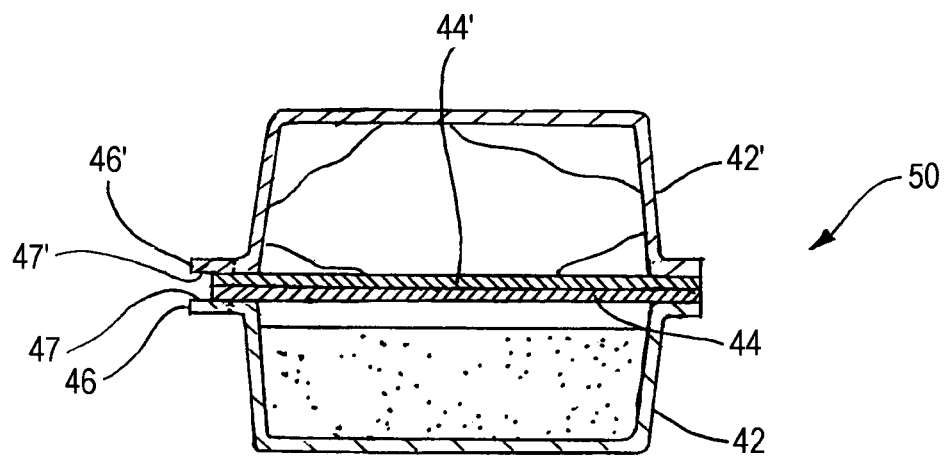
FIG. 8 is a schematic section of a packaging unit formed by two containers of the type shown in FIG. 7.

As shown in FIG. 8, the container 42 can be joined to a second container 42' of a similar shape to form a packaging unit 50, in which the closing portion 44 is in contact with the corresponding closing portion 44' of the second container 42'. The two containers are joined together along a peripheral zone of the respective closing portions. In order to separate the two containers, the consumer grasps the opening tab 46 of the container 42 and the corresponding opening tab 46' of the second container 42' and pulls the two opening taps so as to move one container away from the other one.

In order to enable the two adjacent containers to be separated from one another, it is necessary for the respective opening tabs not to be attached to one another. This is made possible by the uncovered zone 47 of the container 42 and by the corresponding uncovered zone 47' of the second container 42'. In fact, at the uncovered zones 47 and 47' the closing films 22 of the containers do not come into contact with one another, which ensures that the opening tabs 46 and 46' are not attached to one another whilst the container 42 is joined to the second container 42'. This may, for example, occur because the closing film 22 that forms the closing portions 44 and 44' is thermoweldable, whilst the sheet material 2 that forms the containing cavities is not. A possible thermowelding station that welds the container 42 to the second container 42' does not therefore join the uncovered zones 47 and 47' to one another.

After the container 42 has been separated from the second container 42', the consumer can open the container 42 by grasping the opening tab 46 and pulling the opening tab 46 to the side opposite the containing cavity 3. In this manner, the sheet material 2 is broken along the intended separating line 49, but the closing film 22 remains joined to the opening tab 46 in the coupling zone 48. By acting further on the closing tab 46, the consumer can thus remove the closing film 22 from the containing body 43, owing to a peeling action of the closing film 22 along the edge zone 41.

Figure 9:
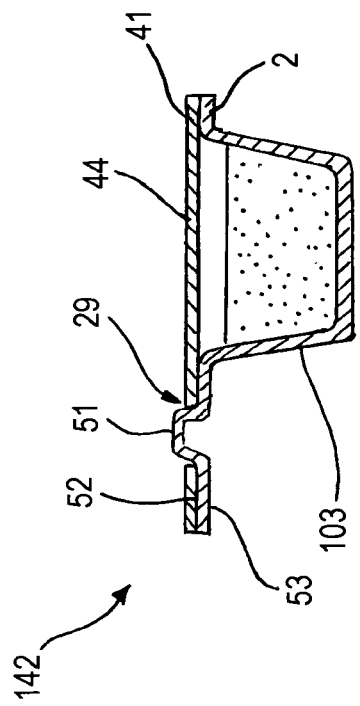
FIG. 9 is a schematic section of a container that is obtainable with the apparatus in FIG. 4.

FIG. 9 shows a container 142 comprising a containing cavity 103 obtained on the sheet material 2. Outside the containing cavity 103, on the sheet material 2 a protrusion 51 is further provided that projects from a face 52 of the sheet material 2. The face 52 is opposite a further face 53 of the sheet material 2 from which the containing cavity 103 projects.

The protrusion 51 may, for example, be used to couple the container 142 with another container that is not shown if it is desired to obtain a complex packaging unit. The protrusion 51 can be formed in the forming station 12 of the forming apparatus 1.

On the closing film 44 an opening 29 is obtained that is positioned at the protrusion 51, so that the protrusion 51 passes through the opening 29 and protrudes from the closing film 44.

In one embodiment, both the protrusion 51 and the opening tab 46 shown in FIG. 7 can be present on the same container.

Before starting to produce containers of the type shown in FIGS. 7 and 9, in the cutting station 24 the position of the cutting device along the supply direction F2 is adjusted by acting on the adjusting device. In this manner it is ensured that the shearing members 26 obtain the openings 29 on the closing film 44 in a position corresponding to that of the protrusions 51 or of the zones of the sheet material 2 intended for giving rise to the opening tabs 46.

During operation, after possibly adjusting the position of the cutting device included in the cutting station 24, the closing film 22 is unwound from the respective reel 23 and indexed along the supply direction F2. The closing film 22 passes through the cutting station 24, in which the openings 29 are obtained. Simultaneously, the sheet material 2 on which the containing cavities 3 are obtained, already filled with the product 20, is indexed along the conveying direction F3.

The closing film 22, after being switched from the supply direction F2 to the conveying direction F3 by means of the direction-switching device, including the direction-switching roller 32, is imposed on the sheet material 2 and joined thereto in the welding station 31, so as to close the containing cavities 3.

After the closing film 22 has closed the containing cavities 3 in the welding station 31, the separating device 45, if activated, can cut the closing film 22 and the sheet material 2, so as to separate discrete groups of containing cavities 3 closed by the closing film 22. The discrete groups that are thus obtained can be subsequently stored or be processed manually, or yet be conveyed to another place to be subjected to subsequent processing.

In one embodiment that is not shown, the welding station 31 and the cutting station 24 can be arranged according to a layout that is different from that shown in FIG. 4, for example aligned along a common direction.

FIGS. 4 to 6 show a configuration in which the welding apparatus 21 processes a continuous sheet material 2 on which the containing cavities 3 are obtained. In particular, the welding station 31 enables the closing film 22 to be joined to the continuous sheet material 2, which closing film 22 is unwound from the respective reel 23 so as to close the containing cavities 3. In this configuration, the welding apparatus 21 can be inserted into a production line of containers, for example downstream of a filling unit positioned outside the forming apparatus 1 shown in FIGS. 1 and 2.

If the welding apparatus 21 is inserted into a production line, the welding apparatus 21 is used for industrial production of large quantities of containers.

Alternatively, the welding apparatus 21 can be used in isolation, for example by manually supplying the welding apparatus 21 with discrete groups of containing cavities 3. Such discrete groups can be obtained by manually filling groups 18 of containing cavities, of the type shown in FIG. 3, with the product 20.

In order to process without drawbacks the discrete groups of containing cavities 3, the welding apparatus 21 comprises a control device for checking whether, whilst the welding station 31 is processing a group of containing cavities 3, a subsequent group of containing cavities 3 is in a preset position upstream of the welding station 31 and is waiting to be processed. The control device comprises a sensor element, for example a photocell 54, shown in FIG. 4, arranged along the portion 102 of the path of the conveying device that conveys the groups of containing cavities 3 to the welding station 31. The sensor element can be positioned upstream of the region of the conveying device in which the closing film 22 is brought near the sheet material 2, so as not to be influenced by the closing film 22.

Figure 10:
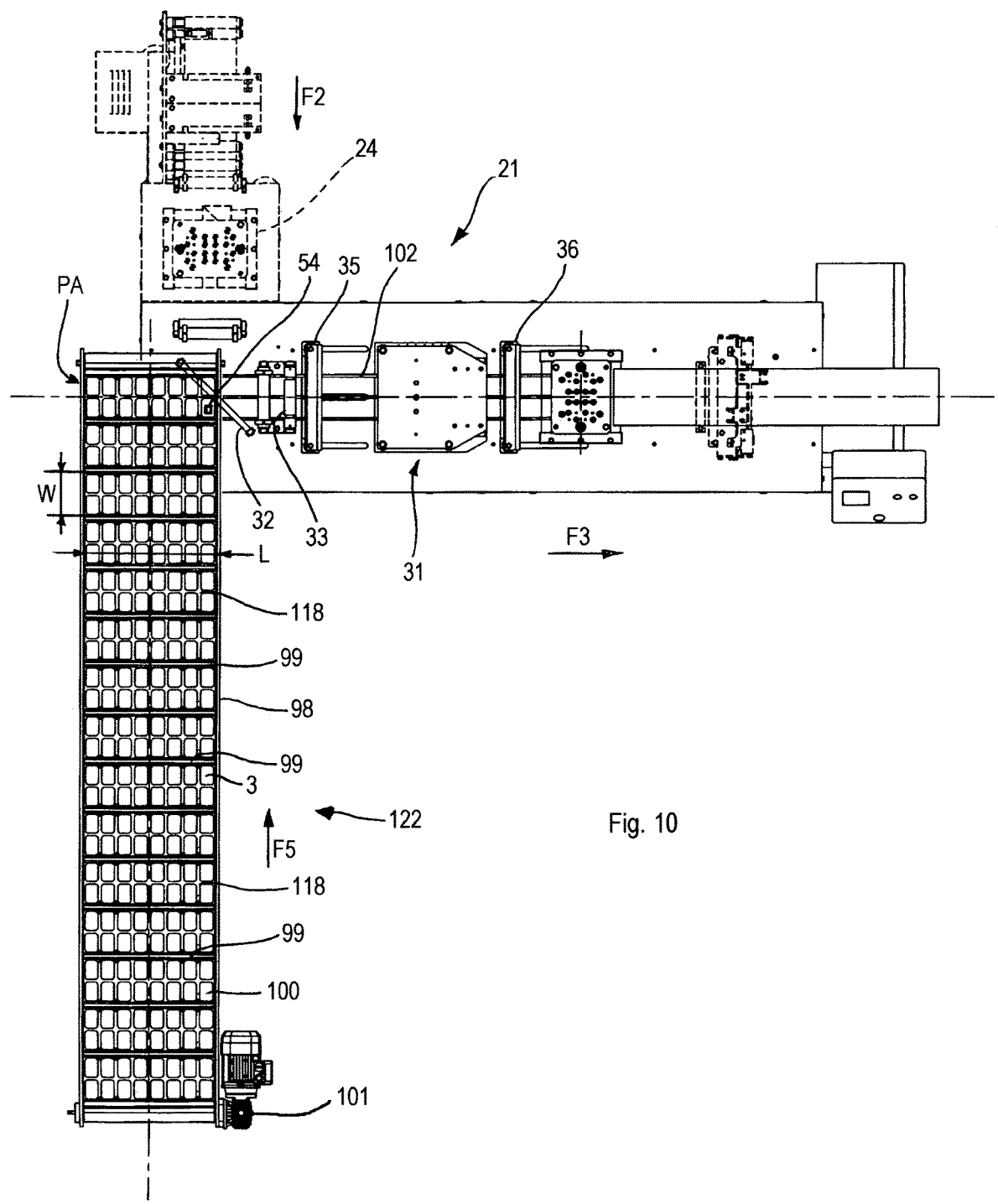
FIG. 10 is a plan view of an apparatus similar to that in FIG. 4, configured so as to process discrete groups of containing cavities.

The operation of the sensor element will be disclosed in detail with reference to FIG. 10, which illustrates a welding apparatus 21 that is completely analogous to the welding apparatus shown in FIG. 4, in a configuration in which the welding apparatus 21 processes discrete groups of containing cavities 3. The parts of the welding apparatus 21 shown in FIG. 10 that are analogous to those in FIGS. 4 to 6 are indicated by the same reference numbers and are not disclosed in detail.

The welding apparatus 21 comprises a conveying device including an inlet conveyor 98 arranged for conveying discrete groups 118 of containing cavities 3, filled with the product 20, in an inlet direction F5 that may be transverse to the conveying direction F3. In the example shown, the inlet direction F5 is perpendicular to the conveying direction F3.

The discrete groups 118 thus move along a path that comprises, upstream of the portion 102 that passes through the welding station 31, a further portion 122 defined by the inlet conveyor 98. The further portion 122 is transverse, in particular perpendicular, to the portion 102.

The inlet direction F5 can be parallel and opposite the supply direction F2 along which the closing film 22 is advanced. In this case the welding apparatus 21 is arranged according to a "T"-shape layout.

The inlet conveyor 98, which can be of the belt type, can comprise a plurality of dividing elements 99 that define on the inlet conveyor 98 corresponding housings 100. Each housing 100 has dimensions that are such as to receive a single discrete group 118. Each dividing element 99 can comprise a bar fixed to the inlet conveyor 98 and extending in a direction that is transverse, in particular perpendicular, to the inlet direction F5.

Each discrete group 118 comprises, in the example shown, two rows of containing cavities 3, each row including eight containing cavities 3. Each discrete group 118 has a greater or longitudinal dimension L and a lesser or transverse dimension W. The discrete groups 118 are positioned on the inlet conveyor 98, for example manually, so that the greater dimension L is transverse, in particular perpendicular, to the inlet direction F5.

A drive device 101 drives the inlet conveyor 98 so that the discrete groups 118 are indexed in the inlet direction F5.

The conveying device further comprises a transferring device, which is not shown and is arranged for removing the discrete group 118 positioned in the most advanced position PA of the inlet conveyor 98 and transferring the discrete group 118 to the portion 102. Along the portion 102, which in the example shown is rectilinear, the welding station 31 is arranged.

The transferring device can comprise a transferring gripper, similar to the gripper 35 and to the further gripper 36, or a thrust device suitable for pushing the discrete group 118 positioned in the most advanced position PA to the gripper 35.

The sensor element, comprising, for example, the photocell 54, is positioned along the path of the inlet conveyor 98 so as to detect the presence of a discrete group 118 in the most advanced position PA. In particular, the sensor element is positioned in an intersecting zone in which the path of the inlet conveyor 98 along the inlet direction F5, i.e. the further portion 122, intersects the portion 102 that extends along the conveying direction F3. In this manner the sensor element enables a discrete group 118 to be detected, on the inlet conveyor 98, that is ready to be advanced in the conveying direction F3.

The sensor element is positioned so as to detect a front zone of the discrete group 118 in the most advanced position PA, with respect to the conveying direction F3. In the example shown, the sensor element is positioned near a containing cavity 3 nearer the gripper 35.

During operation, an operator manually positions the discrete groups 118 of containing cavities 3, already filled with the product 20, in the corresponding housings 100 of the inlet conveyor 98. The latter indexes the discrete groups 118 in the inlet direction F5. The removing device removes the discrete group 118 arranged on the inlet conveyor 98 in the most advanced position PA with respect to the inlet direction F5 and transfers this discrete group to the portion 102, along the conveying direction F3. The discrete group 118 is then grasped by the gripper 35, which conveys the discrete group 118 to the welding station 31, in which the closing film 22, which may have openings 29, will be joined to the discrete group 118.

The sensor element is connected to a control unit that controls the operation of the welding apparatus 21. If, whilst the welding apparatus 21 is operating, the sensor element detects the presence of a discrete group 118, the control unit enables the welding station 31 to operate regularly, i.e. without interruption. Subsequent discrete groups 118 that are constantly detected by the sensor element in fact imply that the discrete groups 118 are supplied without interruption to the welding station 31, as if these groups formed a continuous strip of containing cavities. The welding apparatus 21 can thus act as disclosed previously with reference to FIGS. 4 to 6.

If, on the other hand, the sensor element does not detect the presence of a discrete group 118, the control unit connected to the sensor element arrests the welding station 31. Simultaneously, also the cutting station 24 and the unwinding of the closing film 22 from the respective reel 23 are stopped. The welding apparatus 21 thus remains stationary until a discrete group 118, for example positioned manually by an operator, is detected by the sensor element.

In an alternative embodiment, the control unit can be programmed in such a manner that, if the sensor element does not detect the presence of a discrete group 118, the welding apparatus 21 is not immediately arrested. The drive device 101 continues to move the inlet conveyor 98 for a preset period of time, during which the sensor element can detect the possible presence of a subsequent discrete group 118. If no discrete group 118 is detected in the preset interval of time the welding apparatus 21 is stopped.

If it is desired that the welding apparatus 21 process a continuous strip of containing cavities 3, as shown in FIGS. 4 to 6, the sensor element can be disabled. Further, the inlet conveyor 98 can be dismantled or deactivated and the welding apparatus 21 can be supplied with a continuous strip of containing cavities 3 conveyed along the conveying direction F3, as shown in FIG. 4.

In this manner, a very versatile welding apparatus 21 is obtained that can pass easily from the production of large batches of containers to the production of small quantities of containers forming discrete groups, and vice versa.

It is understood that the cutting station 24 can also be inserted inside a welding apparatus that is permanently integrated into a continuous production line of containers, this apparatus being devoid of sensor element, including the photocell 54. On the other hand, the sensor element including the photocell 54 can also be used in a welding apparatus that does not obtain openings in the closing film and in which the cutting station 24 is thus absent.

Figure 11:
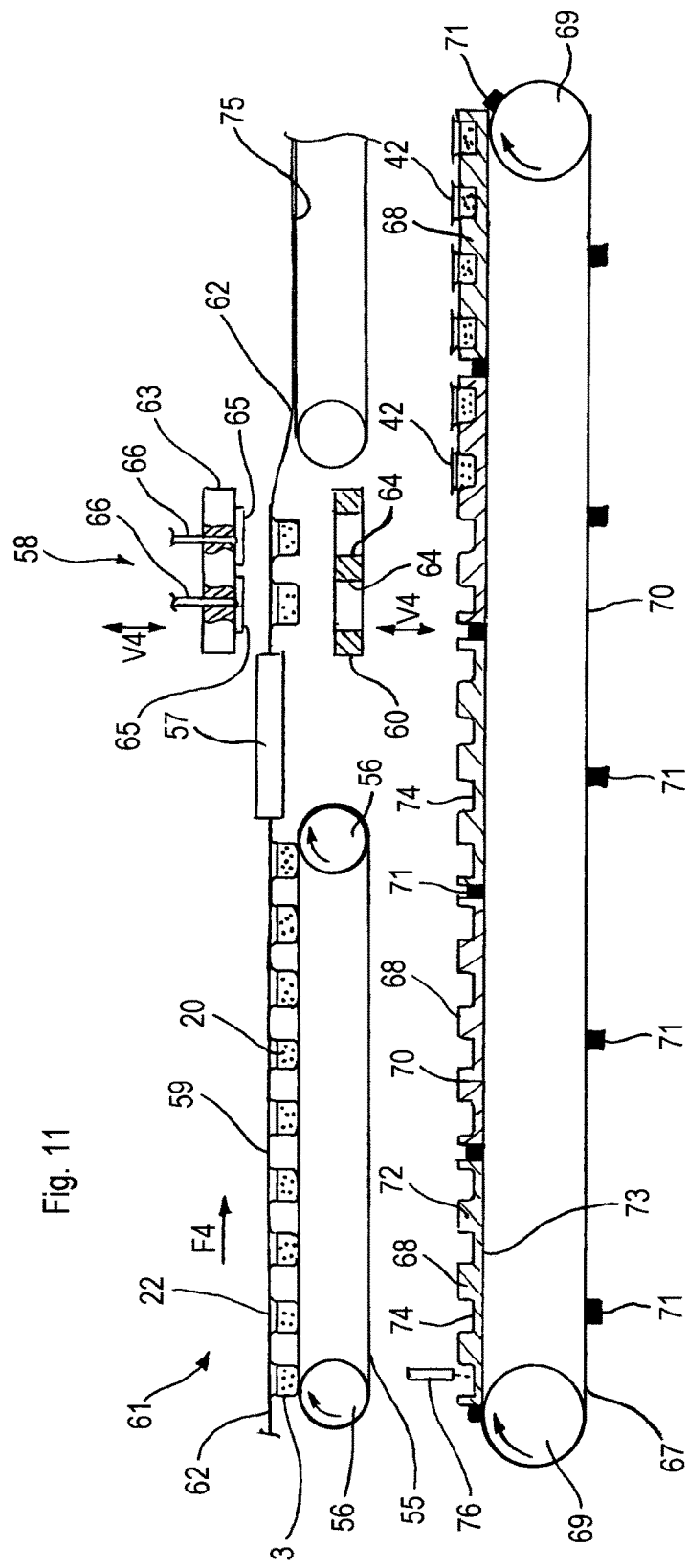
FIG. 11 is a schematic side view of an apparatus for separating single containers from a sheet material.

FIG. 11 schematically shows a separating apparatus 61 for separating from a portion 59 of flat material 62 single containing elements comprising containers 42. The containers 42 are obtained by filling with the product 20 the containing cavities 3, formed for example from the forming apparatus 1, and subsequently closing the cavities with the closing film 22, applied, for example, by the welding apparatus 21. The flat material 62 comprises the sheet material 2 coupled with the closing film 22. The flat material 62 is arranged on a substantially horizontal plane.

The portion 59 of flat material 62 can have a continuous form, in which case the separating apparatus 61 processes a continuous strip of containers 42, or have a discrete form, in which case the separating apparatus 61 processes discrete groups of containers 42, as will be disclosed in greater detail below. In the case shown in FIG. 11, the portion 59 of flat material 62 is a continuous portion.

The separating apparatus 61 comprises a conveying device, including, for example, a conveyor belt 55 wound on at least a pair of pulleys 56 to advance the portion 59 of flat material 62 in a conveying direction F4. The conveying device further comprises a pair of conveying grippers 57, arranged for grasping the flat material 62 conveyed by the conveyor belt 55 and for conveying the flat material 62 to an operating unit comprising a shearing station 58. The conveying grippers 57 are positioned opposite one another to grasp two opposite strips of the flat material 62. In FIG. 11 only the conveying gripper 57 is visible that is arranged in front of the flat material 62. This gripper hides the conveying gripper 57 arranged behind the flat material 62, which is thus not visible.

The conveying grippers 57 are movable between a grasping configuration in which they grasp the side edges of the flat material 62 to index the flat material 62 to the shearing station 58 along the conveying direction F4, and a free configuration, in which the conveying grippers 57 do not engage with the flat material 62 and are free to move parallel to the conveying direction F4 with respect to the flat material 62.

The shearing station 58 comprises a lower half mould 60 and an upper half mould 63, arranged on opposite sides of the flat material 62. The lower half mould 60 and the upper half mould 63 are movable transversely to the conveying direction F4, as indicated by the arrows V4, between a shearing position that is not shown and a non-operating position shown in FIG. 11. In the non-operating position, the lower half mould 60 and the upper half mould 63 are spaced apart from one another in such a way that the flat material 62 can be moved through the shearing station 58. In the shearing position, the lower half mould 60 and the upper half mould 63 are mutually in contact to separate the containers 42 from the flat material 62.

In the thickness of the lower half mould 60 at least one passage 64 is obtained, i.e. a through opening having dimensions such as to be able to be traversed by a container 42 after the latter has been separated from the flat material 62, for the reasons that will be disclosed below.

The upper half mould 63 is provided with shearing blades 65, arranged along a desired profile along which each container 42 will be cut. The upper half mould 63 further comprises at least a stem 66, passing through the thickness of the upper half mould 63, each stem 66 being movable transversely to the conveying direction F4, in particular perpendicularly to this direction, as indicated by the arrow V4. The stroke of the stems 66 is greater than the stroke of the upper half mould 63. The stems 66 have respective lower ends that can be provided with gripping elements that are not shown, for example suction cups. The gripping elements enable the containers 42 to be retained whilst the latter are moved by the stems 66.

Figure 12:
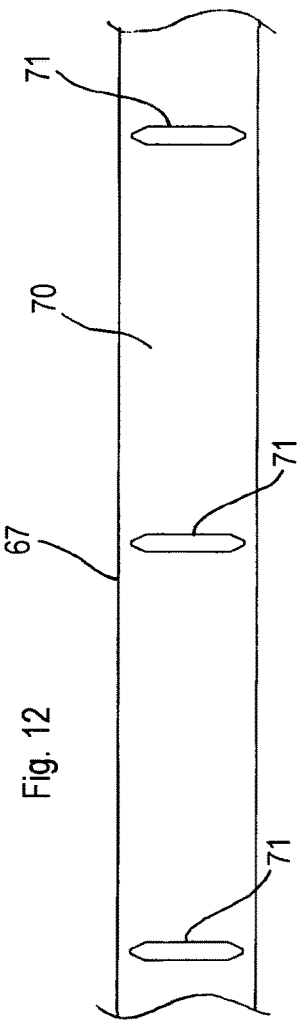
FIG. 12 is a schematic plan view showing a detail of a conveyor belt of the apparatus in FIG. 11.

Below the shearing station 58 a conveying device is movable that may, for example, comprise a conveying belt 67 for conveying to the shearing station 58 a plurality of collecting trays 68 intended for receiving the containers 42. The conveyor belt 67 is wound on respective pulleys 69 that move the conveyor belt 67 parallel to the conveying direction F4. The conveyor belt 67 has an external surface 70 on which reference elements 71 are arranged to enable the collecting trays 68 to be positioned correctly on the conveyor belt 67. The reference elements 71 protrude from the external surface 70 and are distributed in an equidistant manner along the conveyor belt 67. In the example shown, the distance between two consecutive reference elements 71 is substantially the same as the length of a collecting tray 68 in the conveying direction F4. As shown in FIG. 12, the reference elements 71 have the shape of elongated elements, for example a square or rectangular cross section, that extends for a significant fraction of the width of the conveyor belt 67, said width being measured transversely to the conveying direction F4. The reference elements 71 can thus be shaped as slats, which can be attached to the external surface 70 of the conveyor belt 67 for example via screws or adhesive substances.

Each collecting tray 68 comprises a body 72, having a resting surface 73 suitable for being rested on the conveyor belt 67, that can be, for example, substantially flat. In the body 72 a plurality of seats 74 are obtained, each seat 74 being intended for housing a container 42. When the collecting tray 68 is below the shearing station 58, the containers 42 are dropped into the seats 74 until they fill the entire collecting tray 68. The collecting tray 68 that is thus filled enables the containers 42 to be handled more easily, for example to convey the containers 42 to subsequent processing zones or to store the containers 42.

In one embodiment, the collecting tray 68 can also comprise a display stand inside which the containers 42 are housed whilst they are in a shop to be sold.

Along the path of the conveyor belt 67 a detecting device can also be provided, for example a photocell detector 76, that detects the passage of the reference elements 71. The photocell detector 76 is connected to a control unit that controls the operation of the separating apparatus 61 and enables the position of the conveyor belt 67 to be adjusted in relation to the conveyor belt 55, so that the seats 74 of the collecting trays 68 are arranged at the containers 42.

The separating apparatus 61 further comprises an outlet conveyor 75, positioned downstream of the shearing station 58 and movable in the conveying direction F4 to move to a disposal zone that is not shown the flat material 62, after the containers 42 have been separated from the latter.

Before the separating apparatus 61 starts to separate the containers 42, the photocell detector 76 detects the position of the reference elements 71 arranged along the conveyor belt 67 and communicates this position to the control unit. The control unit processes the position of the conveying elements 71 and, on the basis of the type of collecting trays 68 used, calculates the position of the seats 74. If necessary, the control unit moves the conveyor belt 68 so as to move the conveying elements 71 to a preset position in which the seats 74 are below passages 64 when the corresponding containers 42 are separated from the flat material 62. In this manner, each container 42 can fall precisely inside a seat 74.

During operation, the conveyor belt 55 advances the containers 42, joined by the flat material 62, in the conveying direction F4. In the case shown in FIG. 11, in which the separating apparatus 61 is integrated into a production line of containers and processes a continuous strip of flat material 62, the flat material 62 that enters the separating apparatus 61 can come directly from the welding apparatus 21.

Whilst the conveyor belt 55 advances the containers 42, joined by the flat material 62, the conveyor belt 67 indexes the collecting trays 68, which have been previously positioned on the conveyor belt 67, for example manually. The reference elements 71 ensure that the collecting trays 68 are positioned correctly on the conveyor belt 67, so that each seat 74 is in step with a corresponding container 42.

At the conveyor belt 55 outlet, the conveying grippers 57 grasp the two opposite longitudinal edges of flat material 62 and indexes the containers 42 in the shearing station 58. When the containers 42 are stationary in the shearing station 58, the lower half mould 60 and the upper half mould 63 are taken to the shearing position, in which the shearing blades 65 separate the single containers 42 from the flat material 62. The stems 66 slide downwards so that the gripping elements fixed to the stems 66 engage with the containers 42 before the latter are separated from the flat material 62.

After the containers 42 have between separated from the flat material 62, the stems 66, the gripping elements of which still retain the containers 42, move further downwards so as to move the containers 42 to corresponding seats 74 of a collecting tray 68 underneath. When the stems 66 have taken the containers 42 near the collecting tray 68, the gripping elements release the containers 42 in the seats 74.

Subsequently, the lower half mould 60 and the upper half mould 63 move away from one another, and the flat material 62, from which the containers 42 have been separated, is conveyed to the disposing zone by the outlet conveyor 75. The collecting trays 68, after being filled with the containers 42, are moved way from the shearing station 58 by the conveyor belt 67 and are then taken away by the operator.

Figure 13:
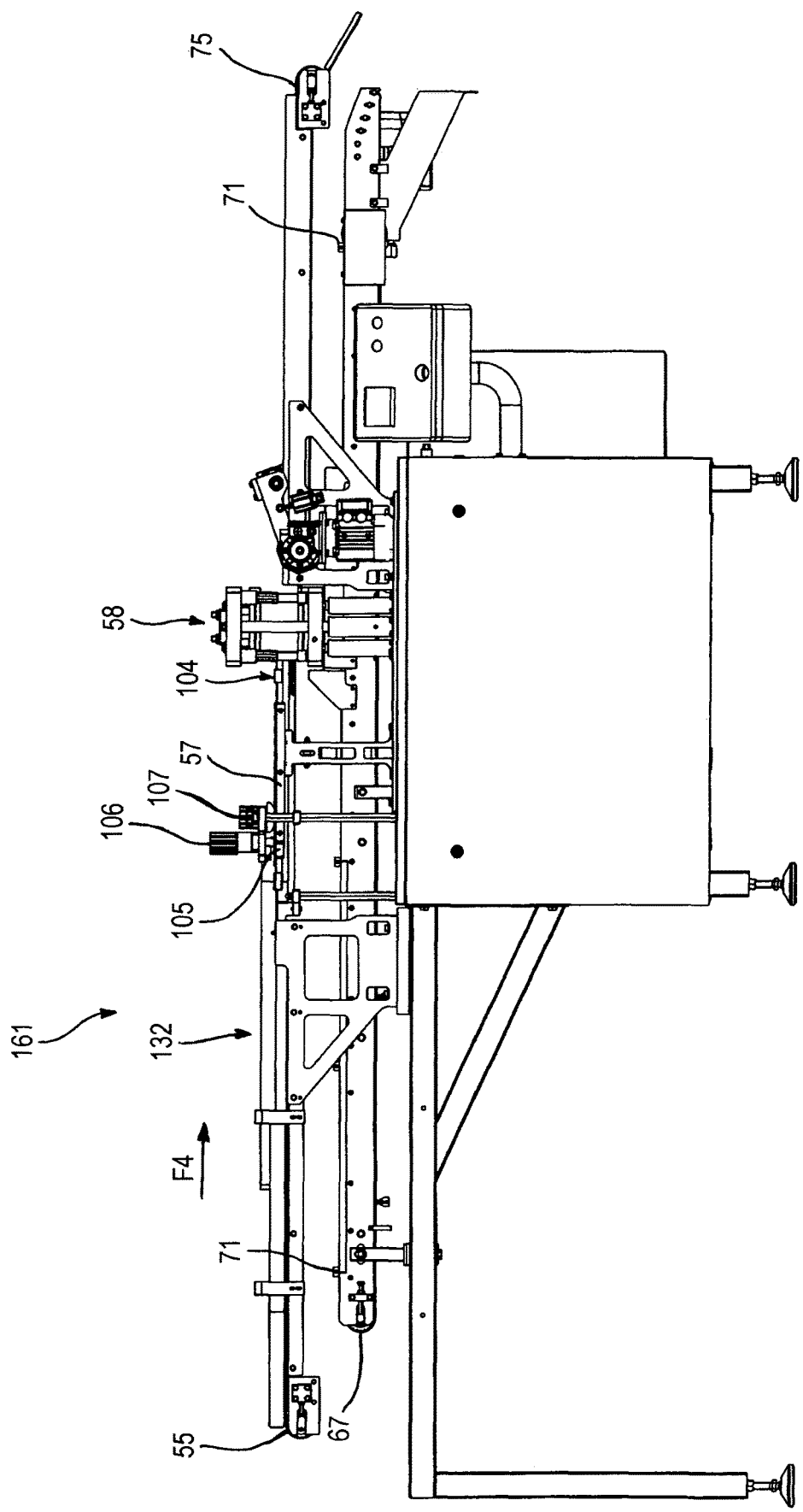
FIG. 13 is a side view of an apparatus similar to that in FIG. 11, showing a control device included in the apparatus.

FIG. 13 shows a separating apparatus 161 that is similar to the separating apparatus 61 shown in FIG. 11. FIG. 13 highlights the control device that enables the separating apparatus 161 both to process continuous strips of containers 42 and to process discrete groups comprising a preset number of containers 42 joined together by the flat material 62.

It is understood that the control device that will be disclosed below with reference to FIG. 13 can also be included in the separating apparatus 61 shown in FIG. 11, in order to enable the apparatus to process discrete groups of containers 42.

The parts of the separating apparatus 161 that are analogous to parts of the separating apparatus 61 are indicated by the same reference numbers and are not again disclosed in detail.

The control device comprises a sensor element arranged along a path 132 of the conveyor belt 55 upstream of the shearing station 58.

The sensor element comprises a detector 104, comprising for example a photocell, positioned immediately upstream of the shearing station 58 with respect to the conveying direction F4. The detector 104 is used to detect the presence of a first discrete group of containers in a preset position, when the separating apparatus 161 is started up to start to separate containers from the flat material 62.

The sensor element further comprises a sensor 105, including for example a photocell, arranged upstream of the shearing station 58 with respect to the conveying direction F4. The sensor 105 is positioned upstream of the detector 104 and is spaced away from the latter. The distance between the detector 104 and the sensor 105 may be greater than the length of each discrete group of containers, measured in the conveying direction F4. The sensor 105 is used to detect whether, immediately after a discrete group of containers has been advanced downstream of the sensor 105 to be processed in the shearing station 58, a subsequent discrete group of containers is available for being advanced to the shearing station 58.

The separating apparatus 161 further comprises a stopping device for stopping the discrete groups of containers in one or more preset positions. The stopping comprises device a stopping element for stopping, in a preset position, the first discrete group of containers that enters the separating apparatus 161 when the latter is started up. The stopping element is movable between a stop position, in which the stopping element prevents the first discrete group of containers from continuing along the conveying direction F4, and a passage condition in which the stopping element does not hamper the passage of the first discrete group of containers. In the example shown, the stopping element comprises a stem of an actuator 106, for example of hydraulic or pneumatic type. The stopping element is arranged near the sensor 105. More precisely, the stopping element is arranged immediately downstream of the sensor 105 with respect to the conveying direction F4.

The stopping device further comprises a stopping device for stopping, in a preset position upstream of the shearing station 58, discrete groups of containers that follow a discrete group that has already been advanced downstream of the actuator 106. The stopping device may comprise an actuator cylinder 107, of hydraulic or pneumatic type, having a stem that is movable between a stop position and a passage position.

The actuator cylinder 107 can be positioned immediately downstream of the actuator 106 along the conveying direction F4.

When the separating apparatus 161 is started up for the first time, no discrete group of containers is present in the shearing station 58 or along the conveyor belt 55. Consequently, the detector 104 does not detect the presence of any group of containers. This information is transmitted to a control unit connected to the sensor element. The control unit commands the actuator 106, the stem of which is moved downwards, i.e. is made to emerge outside the actuator 106. In this manner the stem of the actuator 106 is positioned in the stop position.

Subsequently, the conveyor belt 55 is moved to convey along the conveying direction F4 discrete groups of containers, which are positioned by an operator on the conveyor belt 55. The conveyor belt 55 can be moved continuously during the entire period of operation of the separating apparatus 161.

When the first discrete group of containers conveyed by the conveyor belt 55 arrives at the sensor 105, the latter detects the presence thereof. Simultaneously, the first discrete group of containers comes to abut against the stem of the actuator 106 and stops at a precise position determined by this stem. In this position, the conveying grippers 57 grasp the first discrete group of containers and the stem of the actuator 106 is retracted to the passage position to enable the conveying grippers 57 to convey the first discrete group of containers to the shearing station 58.

Subsequently, the first discrete group of containers, moved by the conveying grippers 57, arrives at the detector 104, which detects the presence thereof. When the control unit is informed that the first discrete group of containers has been detected by the detector 104, the actuator 106 is deactivated, so that the stem thereof remains in the passage position. The actuator cylinder 107 is on the other hand activated and the stem of the actuator cylinder 107 is moved outside the actuator cylinder 107, i.e. downwards, so as to reach the respective stopping position. The second discrete group of containers conveyed by the conveyor belt 55 passes below the actuator 106, the stem of which is in the passage position, and stops against the stem of the actuator cylinder 107, which is in the stop position. The second discrete group of containers now acts as a stopping element that stops the third discrete group of containers conveyed by the conveyor belt 55.

In the meantime, the detector 105 has detected the presence of the second discrete group of containers. Consequently, the stem of the actuator cylinder 107 can be retracted to the respective passage position and the second discrete group of containers can be grasped by the conveying grippers 57 and conveyed to the shearing station 58.

As long as the discrete groups of containers continue to be positioned on the conveyor belt 55 and conveyed by the conveyor belt 55, on after another, in the conveying direction F4, the sensor 105 continues to detect the presence of discrete groups of containers and maintains the stem of the actuator cylinder 107 in the passage position. The discrete groups of containers are thus advanced without interruptions to the shearing station 58, which process the discrete groups of containers, as if interacting themselves with a continuous strip of containers.

When the discrete groups of containers are no longer positioned one after another on the conveyor belt 55, for example because the operator no longer has discrete groups to be loaded onto the conveyor belt 55, the sensor 105 no longer detects the presence of discrete groups of containers. Consequently, the actuator cylinder 107 is commanded so as to take the respective stem to the stop position and operation of the separating apparatus 161 is temporarily interrupted.

The actuator cylinder 107 remains in the stop position until the moment in which a subsequent discrete group of containers, moved by the conveyor belt 55, goes to abut against the corresponding stem and is detected by the sensor 105. At this point, the actuator cylinder 107 retracts the stem into the passage position and the discrete group of containers is advanced to the shearing station 58. The separating apparatus 161 thus resumes operating regularly again.

In conclusion, the detector 104 and the actuator 106 work only in the startup steps of the separating apparatus 161, in order to ensure that the first discrete group of containers is introduced inside the separating apparatus 161 in a desired position with respect to the shearing station 58. The sensor 105 and the actuator cylinder 107, on the other hand, work not only at startup but also during operation of the apparatus in order to ensure that all the discrete groups of containers are conveyed correctly to the shearing station 58.

In one embodiment, in which the first discrete group of containers is positioned manually in a desired position upstream of the shearing station 58, it is possible to use only the sensor 105 and the actuator cylinder 107, thus eliminating the detector 104 and the actuator 106.

The sensor element and the stopping device enable the separating apparatus 161 to process discrete groups of containers in a reliable manner to minimise also in this case manual operations. Naturally, the separating apparatus 161 can also process a continuous strip of containers, in which case it is sufficient for the control unit to deactivate the sensor element and maintain the stopping device permanently in the passage position.

The sensor element and the stopping device disclosed with reference to FIG. 13 can also be provided in the separating apparatus 61 shown in FIG. 11.

In one embodiment, the sensor element and the stopping device can be used in a separating apparatus that does not use the collecting trays 68.

Figure 14:
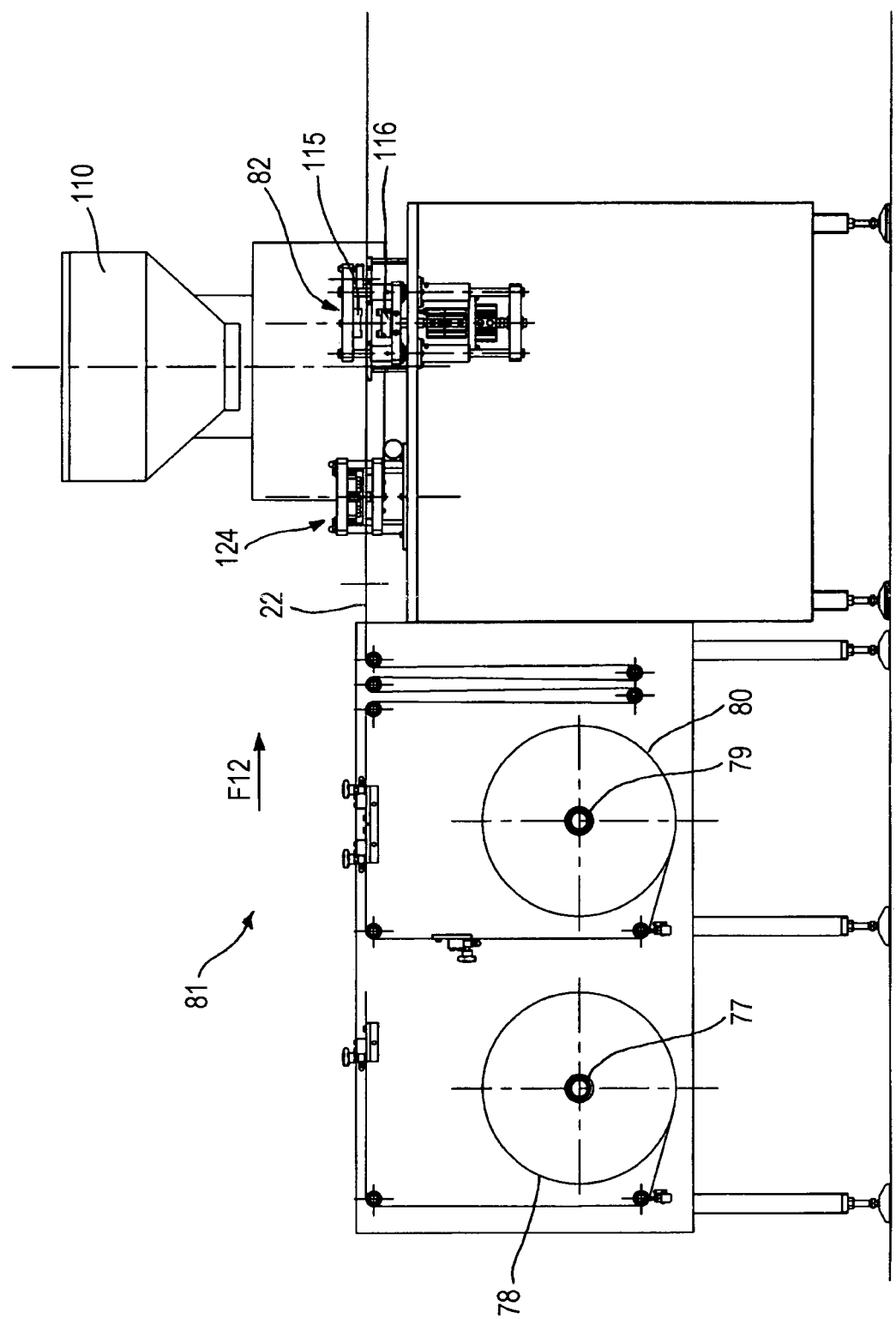
FIG. 14 is a side view of a first portion of an apparatus for applying a closing film to a plurality of containing cavities, according to an alternative embodiment.
Figure 16:
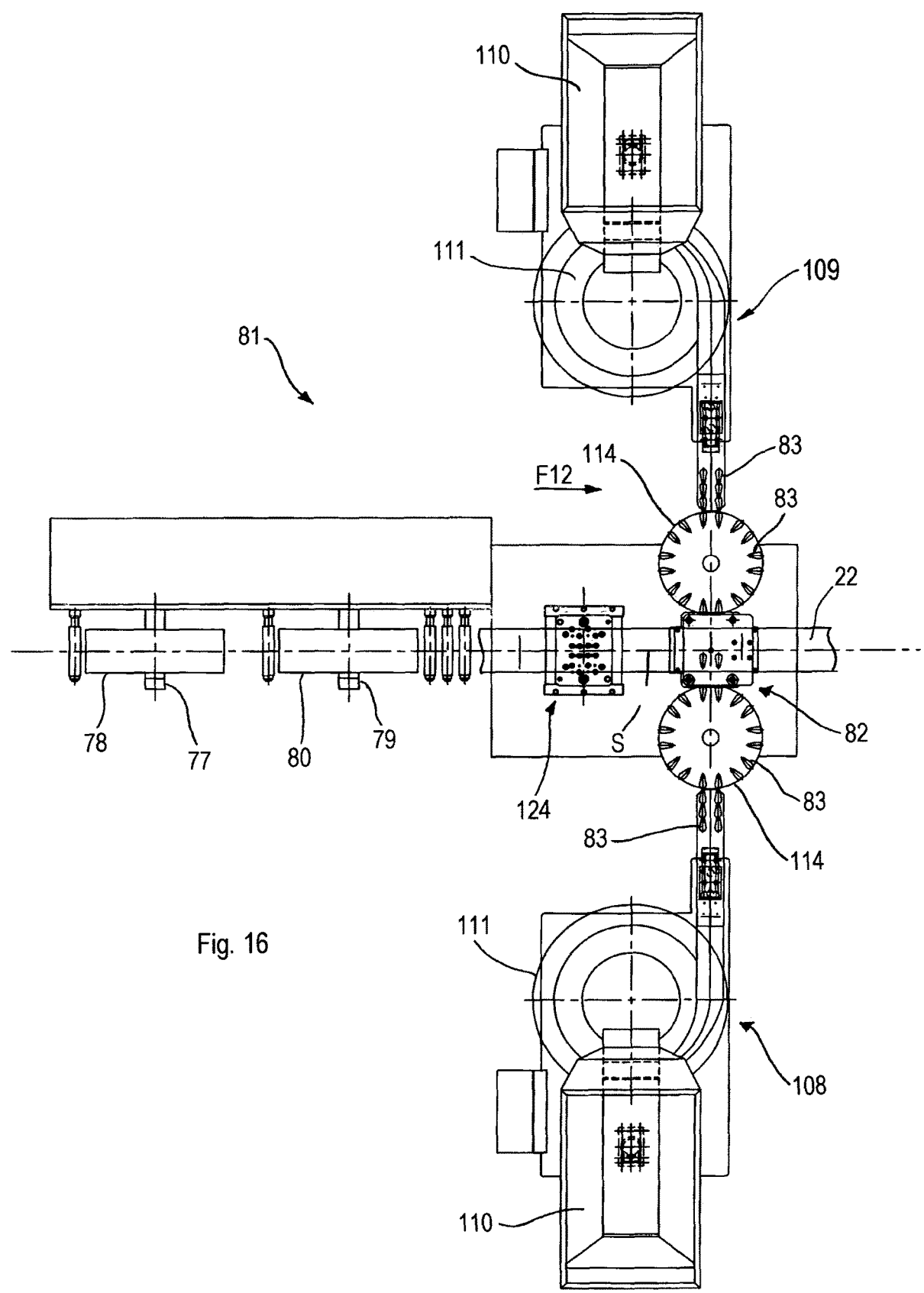
FIG. 16 is a plan view showing a positioning device for positioning a removing element on the closing film, included in the apparatus in FIG. 14.

FIGS. 14 and 16 show an inlet portion of a welding apparatus 81 according to an alternative embodiment. The welding apparatus 81 comprises a first supporting element 77 for supporting a first reel 78 of closing film 22 and a second supporting element 79 for supporting a second reel 80 of closing film 22. The second reel 80 acts as a reserve reel and enables the welding apparatus 81 downtimes to be minimised or even to be reduced to zero when the closing film 22 wound on the first reel 78 finishes.

Naturally, the first supporting element 77 and the second supporting element 79 can also be used in the welding apparatuses 21 shown in FIGS. 4 to 6 and 10.

The closing film 22 is unwound from the first reel 78 by means of known unwinding device, such as to be on a plane that may be substantially horizontal and then be indexed by an advancing device that is not shown along a supply direction F12, which can be substantially horizontal.

Downstream of the first reel 78 there may be a cutting station 124 that enables a plurality of openings to be obtained on the closing film 22 that are intended to leave preset zones of the sheet material 2 uncovered with which the closing film 22 will be subsequently coupled. The cutting station 124 is similar to the cutting station 24 disclosed with reference to FIGS. 4 and 5 and can comprise an adjusting device for adjusting the position of the respective cutting device so as to obtain the openings in the desired positions of the closing film 22.

The cutting station 124 is optional and could be omitted if it is not desired to obtain the openings on the closing film 22.

Figure 19:
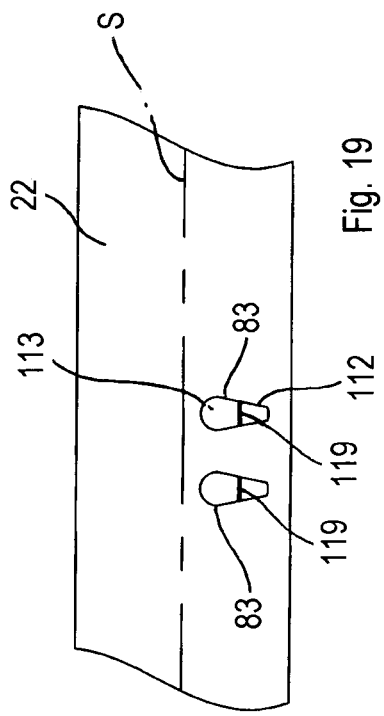
FIG. 19 is a schematic plan view showing a removing element joined to the closing film.

The welding apparatus 81 comprises a joining device 82, that can be arranged downstream of the cutting station 124, to join a removing element to the closing film 22. The removing element can be used by a consumer who purchases the closed container closed by the closing film 22 to remove a substance contained in a containing cavity of said container, or of a different container. As shown in FIGS. 16 and 19, the removing element may comprise spoon elements 83, for example having a substantially flat shape. By using the spoon elements 83, the user can eat a creamy substance contained in the containers that he has purchased. The spoon elements 83 are made of plastics.

The welding apparatus 81 further comprises a positioning device to position the spoon elements 83 on the closing film 22. In the example shown, the positioning device comprises a first positioning device 108 and a second positioning device 109, arranged on two opposite sides of the closing film 22. The first positioning device 108 and the second positioning device 109 enables two rows of spoon elements 83 to be arranged on the closing film 22 that are arranged symmetrically with respect to a symmetry axis S of the closing film 22.

In one embodiment, it is possible to provide the positioning device only on one side of the closing film 22, if it is desired to position on the closing film 22 a single row of removing elements 83.

The first positioning device 108 and the second positioning device 109 have substantially identical structural components and operating modes.

The first positioning device 108 and the second positioning device 109 each include a respective hopper 110 that is filled with a plurality of spoon elements 83 arranged loosely. From the hopper 110 the spoon elements 83 fall into an orientating device 111 below, from which all the spoon elements 83 exit with a preset orientation.

The orientation device 111, which is not described in detail because it is of known type, may comprise a vibration device.

From each orientation device 111 two rows of spoon elements 83 emerge that are oriented so that a gripping portion 112 of each spoon element 83 precedes a removing portion 113 of the corresponding spoon element 83. The gripping portion 112, shown in detail in FIG. 19 is suitable for being grasped by the consumer, whilst the removing portion 113 is suitable for removing the desired product 20 from the container.

The pairs of spoon elements 83 emerging from each orientation device 111 are subsequently received from a transferring carousel 114 that is rotatable around a vertical rotation axis. Each transferring carousel 114, after a rotation of 180°, delivers the pairs of spoon elements 83 to a conveying device that is not shown, comprising for example one or more suction cups or other sucking elements, that positions the spoon elements 83 on the closing film 22 that is stationary in an operation station comprising the joining device 82.

Figure 18:
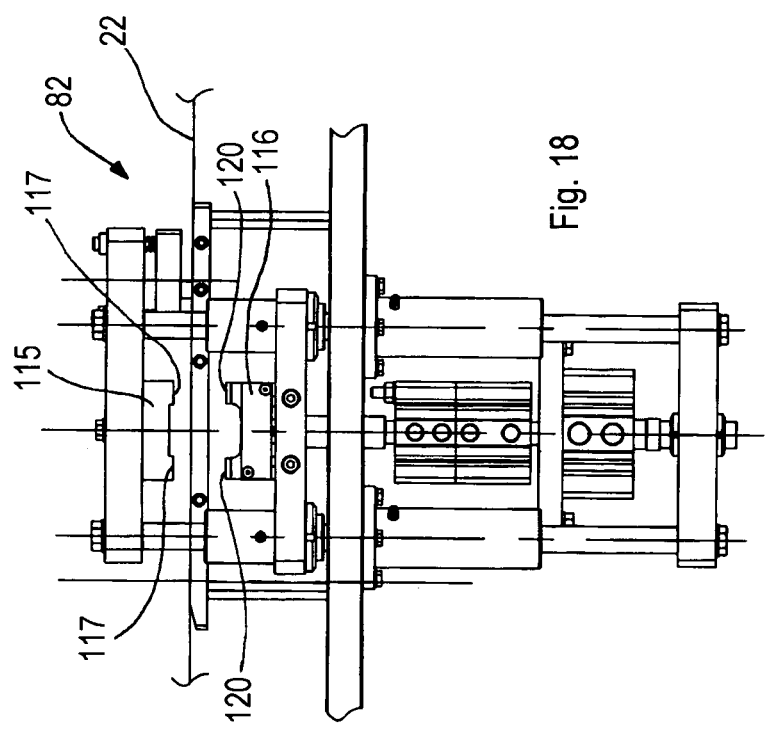
FIG. 18 is an enlarged and fragmentary side view showing a joining device for joining the removing element to the closing film.

As shown in FIG. 18, the joining device 82 comprises a first half mold 115 and a second half mold 116. The first half mold 115 is arranged above the closing film 22, whilst the second half mold 116 is arranged below this film.

The first half mould 115 is provided with protruding elements 117 that project to the closing film 22 so as to come into contact with the spoon elements 83 in joining zones 119. Also the second half mould 116 comprises projecting elements 120 arranged in positions corresponding to the protruding elements 117.

The first half mould 115 and the second half mould 116 are movable with respect to one another, transversely to the supply direction F12, between a distanced configuration shown in FIG. 18 and a contact configuration that is not shown. In the distanced configuration, the first half mould 115 and the second half mould 116 are spaced apart from one another so that the closing film 22 can advance freely between the first half mould 115 and the second half mould 116. In the contact configuration, the closing film 22, together with the spoon elements 83 positioned thereupon, is clamped between the protruding elements 117 of the first half mould 115 and the projecting elements 120 of the second half mould 116. The protruding elements 117 and possibly also the projecting elements 120 are heated, so as to thermoweld the spoon elements 83 to the closing film 22 at the joining zones 119.

In an alternative embodiment, the joining device 82 may comprise an ultrasound joining device to join the spoon elements 83 to the closing film 22 at the joining zones 119 by ultrasound welding.

It is also possible to use a joining device 82 comprising a device for applying an adhesive substance for gluing spoon elements 83 to the closing film 22.

The positioning device and the joining device 82 enable the spoon elements 83 to be joined to the closing film 22 in an automated and precise manner.

Figure 15:
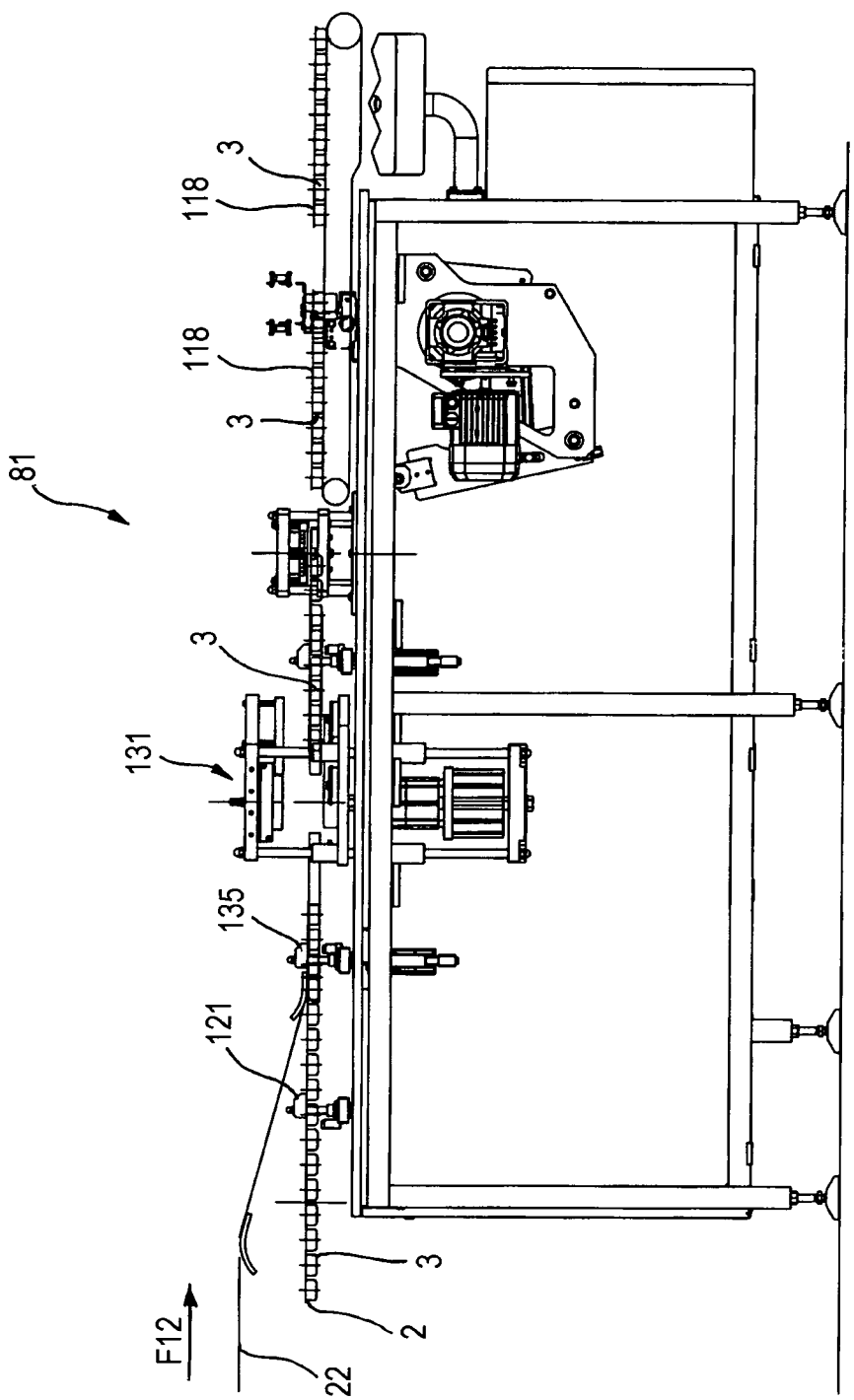
FIG. 15 is a side view of a second portion of the apparatus in FIG. 14.

FIG. 15 shows a final portion of the welding apparatus 81, arranged downstream of the initial portion shown in FIGS. 14 and 16. The final portion of the welding apparatus 81 is arranged downstream of the joining device 82 and receives the incoming closing film 22 to which the spoon elements 83 have been joined. This film moves in the supply direction F12.

By arranging the final portion of the welding apparatus 81 downstream of the initial portion along the advancing direction F12, it is avoided that the closing film 22 undergoes orientation changes that could detach the spoon elements 83.

Downstream of the joining device 82, the welding apparatus 81 comprises a coupling device for coupling by welding the closing film 22 with a sheet material 2 on which the containing cavities 3 have been obtained that were previously filled with a desired product.

The coupling comprises device a welding station 131, that is completely similar to the welding station 31 disclosed with reference to FIGS. 4 and 6.

As previously disclosed with reference to the welding apparatuses 21 shown in FIGS. 4 to 6 and 10, also the welding apparatus 81 can process both a sheet material 2 in continuous form on which the containing cavities 3 were formed, and discrete groups 118 of containing cavities 3, that were previously separated from a sheet material 2 in continuous form.

For this purpose, the welding apparatus 81 comprises a conveying device including a transverse conveyor belt that is not shown, that is very similar to the conveyor belt 98 shown in FIG. 10, to advance the discrete groups 118 in an inlet direction that is transverse, for example perpendicular, to the advancing direction F12. The conveying device may further comprise a transferring gripper 121 for transferring the discrete groups 118 from the transverse conveyor belt to a gripper 135 that is similar to the gripper 35 in FIG. 10.

A control device is further provided that is similar to the control device including the photocell 54 in FIG. 10, to check for the presence of discrete groups 118 that are available for being conveyed to the welding station 131.

If the welding apparatus 81 processes discrete groups 118 of containing cavities 3, the transverse conveyor belt and the control device are activated and the final portion of the welding apparatus 81 acts in the manner disclosed with reference to FIG. 10.

If, on the other hand, the welding apparatus 81 processes a continuous strip of sheet material 2 on which the containing cavities 3 are obtained, the sensor element and the transverse conveyor belt are disabled and the continuous strip of sheet material 2 is advanced in the advancing direction F12 and processed without interruptions.

In the preceding description it has been explained several times that both the forming apparatus and the welding apparatus and the separating apparatus can operate in insulation or be integrated into a single production line.

Figure 20:
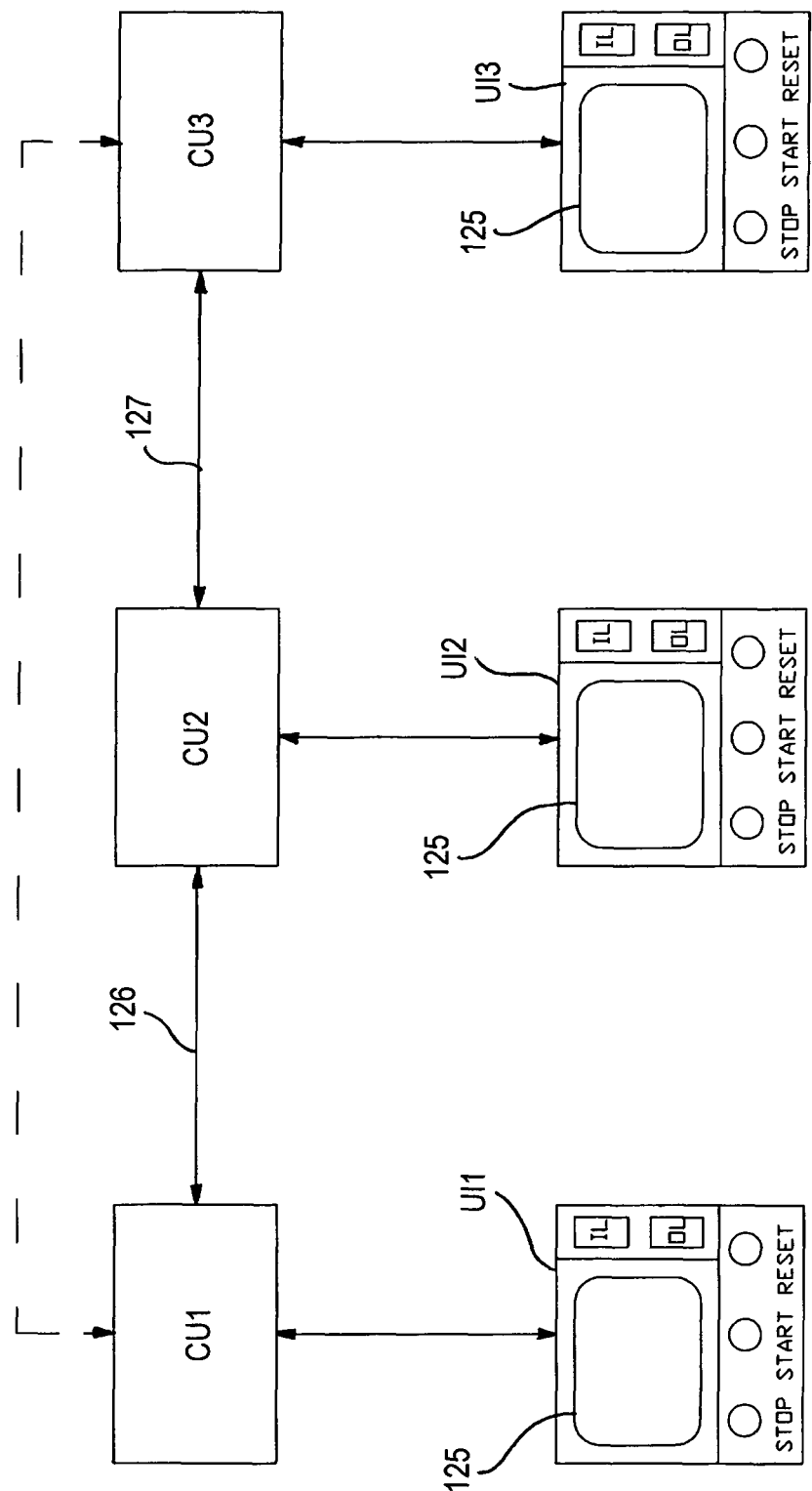
FIG. 20 is a diagram showing a forming apparatus, a welding apparatus and a separating apparatus integrated into a production line.

FIG. 20 is a diagram showing a configuration in which the forming apparatus, the welding apparatus and the separating apparatus are integrated into a line for producing containers. The forming apparatus can be of the type shown in FIGS. 1 and 2 whilst the welding apparatus can be of the type shown in FIGS. 4 to 6 or 14 to 19. Lastly, the separating apparatus can be of the type shown in FIG. 11 or 13.

The forming apparatus has a user interface UI1 connected to a control unit CU1, which controls the operation of the forming apparatus. Similarly, the welding apparatus has a user interface UI2 connected to a control unit CU2, whilst the separating apparatus has a user interface UI3 connected to a control unit CU3.

Each of the three control unit CU1, CU2 and CU3 can comprise a PLC. Each of the three user interfaces UI1, UI2 and UI3 comprises a selecting device by means of which an operator can select whether the corresponding apparatus has to operate in isolation or has to be integrated into a continuous production line. In the isolated operating condition, each apparatus processes discrete groups of containing elements. On the other hand, in the line operating condition, each apparatus processes a continuous strip of containing elements.

The selecting device may comprise, for each apparatus, a pushbutton IL, which is pressed or selected when it is desired that the apparatus operates as part of a line, and a pushbutton OL, which is pressed and selected when it is desired that the apparatus operates in isolation.

Each user interface UI1, UI2 and UI3 can also comprise control pushbuttons by means of which an operator can control the operation of the corresponding apparatus. The control pushbuttons may comprise a START key, which the operator presses to start up the corresponding apparatus, a STOP key, which the operator presses to stop the apparatus, and a RESET key that is pressed to reset possible anomalous operating conditions that have arisen in the apparatus.

Each user interface UI1, UI2 and UI3 further comprises a reporting device for reporting, for example visually, the operating condition of the corresponding apparatus. The reporting device may comprise a green pilot lamp, included for example in the START pushbutton, which indicates that the corresponding apparatus is operating correctly. When the operator presses the START pushbutton to start up the corresponding apparatus, this pushbutton shines with a green light and maintains this color for the entire time for which the apparatus continues to operate.

The reporting device may further comprise a red pilot lamp, included, for example, in the STOP pushbutton, that lights up when the apparatus stops because a malfunction condition has occurred. The red pilot lamp switches off when, following the intervention of the operator, the malfunction has been remedied and the apparatus is ready to operate.

The reporting device further comprises a screen 125, included in each user interface UI1, UI2 and UI3, on which possible messages are displayed relating to the operating status of the corresponding apparatus.

The control units CU1, CU2 and CU3 are connectable together via a connecting device that may comprise an Ethernet network, or a LAN network, or still be of wireless type. In particular, the connecting device comprises a first connecting device 126 for connecting the control unit CU2 of the welding apparatus and the control unit CU1 of the forming apparatus. The connecting device further comprises a second connecting device 127 for connecting the control unit CU2 of the welding apparatus and the control unit CU3 of the separating apparatus. In one embodiment, as indicated with a dashed line in FIG. 20, the second connecting device 127, rather than connecting the separating apparatus to the welding apparatus, can connect the separating apparatus to the forming apparatus. In this case, the control unit CU2 of the welding apparatus and the control unit CU3 of the separating apparatus converse together via the control unit CU1 of the forming apparatus.

If the operator selects the isolated operating condition, the forming apparatus, the welding apparatus and the separating apparatus operate independently of one another, as disclosed in detail above. In the isolated operating condition, the connecting device is deactivated, i.e. the control units CU1, CU2 and CU3 do not communicate together. Each control unit controls only the operation of the respective apparatus. In particular, the separating device 15 of the forming apparatus is activated, so as to separate discrete groups 18 of containing cavities 3 from the sheet material 2. The welding apparatus receives incoming discrete groups of containing cavities 3, already filled with the desired product 20, and closes the discrete groups of containing cavities 3 by means of the closing film 22, which is subsequently cut by the separating device 45. The separating apparatus receives incoming discrete groups of containing cavities 3, closed by the closing film 22, and separates the incoming discrete groups of containing cavities 3 from the flat material 62 for obtaining single containers 42. The operator can read messages relating to the status of the single apparatus on the corresponding screen 125 and can control the operation of each single apparatus via the corresponding START, STOP and RESET pushbuttons.

In the isolated operating condition, the forming apparatus, the welding apparatus and the separating apparatus can be positioned in physically different places or rooms. A producer may also not possess or not simultaneously use all three apparatuses, for example because certain operations are performed manually.

If the line operating condition is selected, the connecting device is activated in such a way that the control units CU1, CU2 and CU3 communicate together. The control unit CU1 of the forming apparatus deactivates the separating device 15 so that from the forming apparatus a continuous strip of containing cavities 3 that are obtained on the sheet material 2 exits. The containing cavities 3 of the continuous strip, after being filled with the product 20 by means of a filling unit that is not shown, enter the welding apparatus, which seals the closing film 22 on the continuous strip of containing cavities 3. The separating device 45 included in the welding apparatus were deactivated by the corresponding control unit CU2. A continuous strip of filled and closed containing cavities 3 is then conveyed to the separating apparatus, which separates the containers 42 from this strip.

Each of the three control units CU1, CU2 and CU3 comprises a synchronising device for synchronising the corresponding apparatus with the other two apparatuses. For this purpose, each of the control units CU1, CU2 and CU3 is programmed so as to exchange with the remaining control units information that enables the forming apparatus, the welding apparatus and the separating apparatus to work in a synchronised manner. For example, when the forming apparatus starts to form the containing cavities 3, the corresponding control unit CU1 sends an operation start signal to the control unit CU2 of the welding apparatus. In response to this signal, the control unit CU2 of the welding apparatus immediately starts operation of the welding apparatus, so that the forming apparatus and the welding apparatus work in a synchronised manner. In one embodiment, the welding apparatus can start up with a controlled delay with respect to the forming apparatus, because the sheet material 2, on which the containing cavities 3 were formed in an intermediate zone between the forming apparatus and the filling unit, can form a compensating loop that enables the operation of the forming apparatus and of the welding apparatus to be staggered slightly.

Further, as soon as the welding apparatus starts to operate, the control unit CU3 of the separating apparatus is duly informed, such as to start up the corresponding welding station immediately. This ensures that the separating apparatus and the welding apparatus work in a synchronised manner.

A similar information exchange also occurs when, for any reason, one of the three apparatuses is arrested.

Each of the three control units CU1, CU2 and CU3 is further programmed so as to exchange with the other two control units information relating to the operating status of the corresponding apparatus, in particular diagnostic information relating to possible fault conditions that occur in the various apparatuses. In the line operating condition, this enables the reporting device of the forming apparatus, of the welding apparatus and of the separating apparatus to be coordinated. In this manner, when in the forming apparatus, or in the welding apparatus, or in the separating apparatus, a malfunction condition occurs, an error message is generated that is displayed simultaneously on all three screens 125. Simultaneously, if the operating condition is such as to determine the stop of the corresponding apparatus, the entire production line stops and on all three user interfaces UI1, UI2 and UI3 the red pilot lamp lights up.

Figure 21:
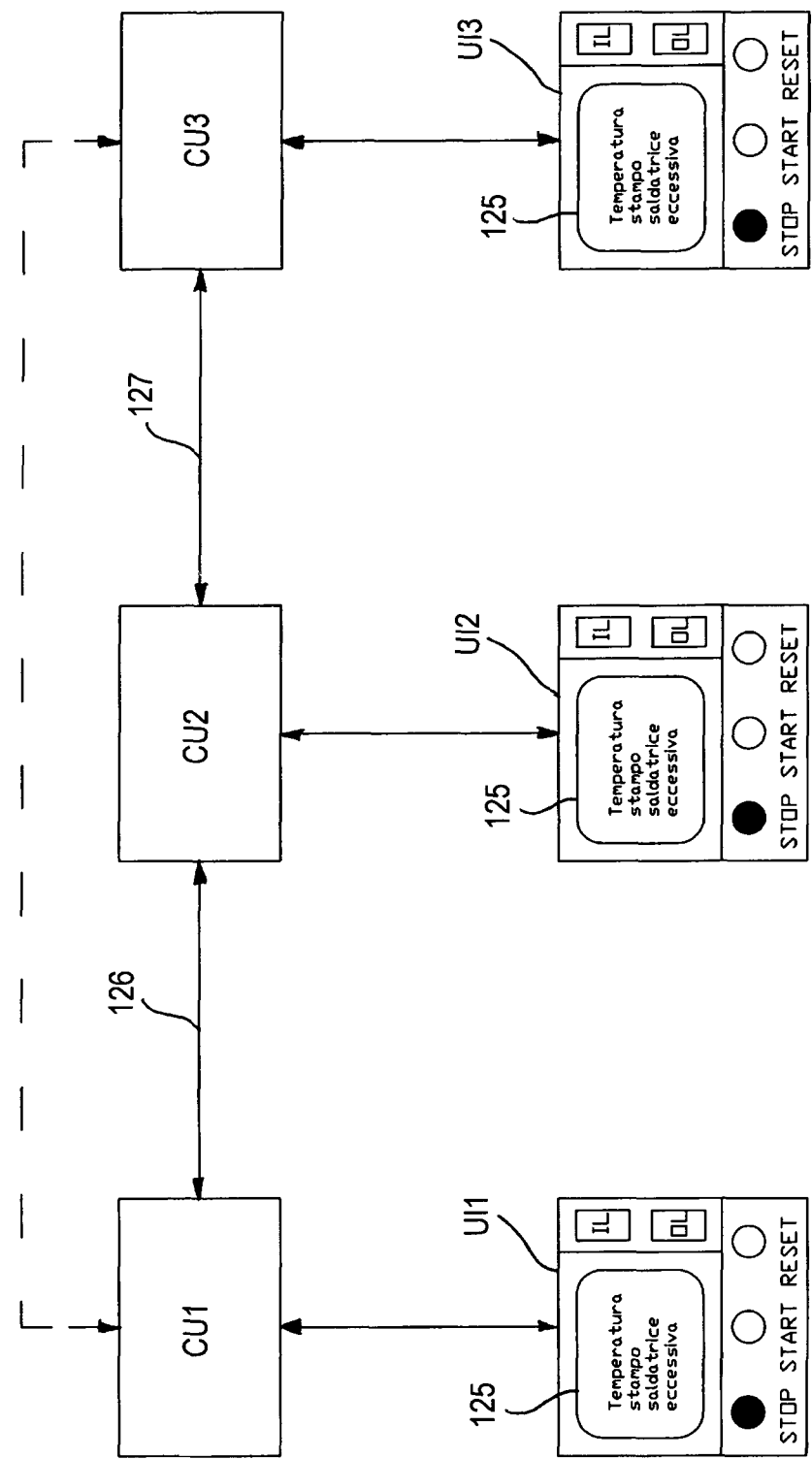
FIG. 21 is a diagram like that in FIG. 20, showing an alarm situation.

An example of this situation is shown in FIG. 21, which refers to a situation in which, in the welding apparatus, excessive temperature of the upper plate 37 and/or of the lower plate 38 shown in FIG. 6 was detected. The control unit CU2 of the welding apparatus thus generates an error message, which can be formulated as "Excessive welding mould temperature". This error message is displayed on the screen 125 of the user interface UI2 of the welding apparatus. The welding apparatus stops and the red pilot lamp included in the corresponding STOP pushbutton lights up.

Simultaneously, the control unit CU2 of the welding apparatus informs the control unit CU1 of the forming apparatus and the control unit CU3 of the separating apparatus, respectively by the first connecting device 126 and the second connecting device 127, of the malfunction condition that has occurred in the welding station. The control units CU1 and CU3 control the corresponding screens 125 so that also on these screens the error message is displayed relating to the problem that has occurred in the welding apparatus. Simultaneously, the forming apparatus and the separating apparatus are arrested and on the corresponding user interfaces the red pilot lamp included in the STOP pushbutton lights up.

Owing to the fact that the reporting device of the forming apparatus, of the welding apparatus and of the separating apparatus are coordinated together, the operator can define the type of problem that has occurred by reading the error message on the screen 125 that is nearest the operator without moving from one end to the other of the production line.

If necessary, the operator can then go to the apparatus in which the malfunction occurred and adopt the measures necessary for solving the problem. When the problem has been solved, the corresponding error message disappears entirely from all three screens 125. At this point, the operator, from any of the three user interfaces UI1, UI2 or UI3, can simultaneously reset all three apparatuses by pressing the RESET pushbutton. Subsequently the operator can simultaneously start up the entire production line by pressing the START pushbutton on any of the three user interfaces UI1, UI2 or UI3.

From what has been shown above, it is obvious that the forming apparatus, the welding apparatus and the separating apparatus enable great flexibility because they are able to work both in isolation and to interface between themselves to be integrated into a common production line.

The invention claimed is:

1. Apparatus for producing containers, comprising an unwinding device for unwinding a closing film from a reel, a coupling device configured to couple said closing film in the form of a continuous web with a sheet material having a plurality of containing cavities, said coupling device including a lower plate interacting with an upper plate, and a joining device arranged upstream of said coupling device for connecting a removing element with said closing film, said removing element being usable by a consumer for removing contents from a containing cavity, wherein said joining device comprises a thermowelding device for welding said removing element to said closing film, said thermowelding device comprising a first half mold and a second half mold transversely movable with respect to one another relative to a supply direction of said closing film between a spaced configuration in which said first half mold and said second half mold are spaced apart from one another so that said closing film can advance freely between said first half mold and said second half mold and a contact configuration in which said closing film together with said removing element are clamped between said first half mold and said second half mold to thermoweld said removing element to said closing film.

2. Apparatus according to claim 1, wherein said removing element comprises at least a spoon element.

3. Apparatus according to claim 1, and further comprising a positioning assembly to position said removing element on said closing film.

4. Apparatus according to claim 3, wherein said positioning assembly comprises a first positioning device and a second positioning device arranged on two opposite sides of said closing film to position two rows of removing elements on said closing film.

5. Apparatus according to claim 3, wherein said positioning assembly comprises a hopper for containing said removing element.

6. Apparatus according to claim 3, wherein said positioning assembly comprises an orientation device for orienting said removing element according to a preset orientation.

7. Apparatus according to claim 6, wherein said positioning assembly comprises a movement device for transferring said removing element from said orientation device to said closing film.

8. Apparatus according to claim 7, wherein said movement device comprises a transferring wheel.

9. Apparatus according to claim 1, and further comprising a separating unit positioned downstream of said coupling arrangement for separating at least one containing cavity from said sheet material.

10. Apparatus according to claim 1, and further comprising a forming unit positioned upstream of said coupling device for forming said containing cavities on said sheet material.

11. Apparatus according to claim 10, and further comprising a filling unit arranged between said forming unit and said coupling device for filling said containing cavities with a product.

12. A method for producing containers, comprising the steps of unwinding a closing film from a reel;
joining a removing element to said closing film by thermowelding, said thermowelding comprising advancing said closing film in a supply direction between a first half mold and a second half mold arranged in a spaced configuration in which said first half meld and said second half mold are spaced apart from one another, clamping said closing filth together with said removing element between said first half mold and said second half mold in a contact configuration so that said closing film locally softens and adheres said removing element to the closing film itself; and
after said joining step, coupling said closing film in the form of a continuous web with a sheet material having a plurality of containing cavities, said removing element being usable for removing contents from a containing cavity, wherein said removing element is joined to said closing film by thermowelding.

13. A method according to claim 12, wherein said removing element comprises a spoon element.

14. A method according to claim 13, wherein said spoon element is substantially flat.

15. A method according to claim 12, wherein said removing element is made of plastics material.

16. A method according to claim 12, and further comprising the step of separating one or more containing cavities closed by said closing film after said closing film from said sheet material has been coupled with said sheet material.

17. A method according to claim 12, wherein said sheet material is shaped as a continuous strip.

18. A method according to claim 12, wherein said containing cavities are joined by a strip of said sheet material to form a discrete group of containing cavities.

19. Apparatus according to claim 1, wherein in said contact configuration, said removing element is clamped between protruding elements of the first half mold and of the second half mold.

* * * * *